United States Patent [19]

Ghosh et al.

[11] Patent Number: 4,498,079
[45] Date of Patent: Feb. 5, 1985

[54] PRIORITIZED OVERLAY OF FOREGROUND OBJECTS LINE BUFFER SYSTEM FOR A VIDEO DISPLAY SYSTEM

[75] Inventors: Atish Ghosh, Glendale Hts.; John Pasierb, Bartlett, both of Ill.

[73] Assignee: Bally Manufacturing Corporation, Chicago, Ill.

[21] Appl. No.: 520,762

[22] Filed: Aug. 8, 1983

Related U.S. Application Data

[63] Continuation-in-part of Ser. No. 294,438, Aug. 20, 1981, Pat. No. 4,398,189.

[51] Int. Cl.³ .............................................. G09G 1/16
[52] U.S. Cl. .................................. 340/725; 273/85 G; 273/DIG. 28; 340/721
[58] Field of Search ........................ 340/725, 726, 721; 273/85 G, DIG. 28

[56] References Cited

U.S. PATENT DOCUMENTS

| | | | |
|---|---|---|---|
| 4,070,710 | 1/1978 | Sukonick et al. | 340/744 X |
| 4,112,422 | 9/1978 | Mayer et al. | 320/324 AD |
| 4,116,444 | 9/1978 | Mayer et al. | 273/101.2 |
| 4,177,462 | 12/1979 | Chung | 340/703 |
| 4,225,929 | 9/1980 | Ikeda | 340/727 X |
| 4,243,984 | 1/1981 | Ackley et al. | 340/725 X |
| 4,324,401 | 4/1982 | Stubben et al. | 340/725 X |

OTHER PUBLICATIONS

*Midway's Galaxian Trouble Shooting Logic Board, Part I,* Franklin Park, Ill., Midway Mfg. Co., 1980, p. 13.
*Midway's Pac-Man Parts and Operating Manual,* Franklin Park, Ill., Midway Mfg. Co., 1980, p. 32.
Giloi, W. K., *Interactive Computer Graphics,* Englewood Cliffs, N.J., Prentice-Hall, 1978, Ch. 7.
Newman, W. M. and Sproull, R. F., *Principles of Interactive Computer Graphics,* N.Y., McGraw-Hill, 1979, Ch. 26.

*Primary Examiner*—David L. Trafton
*Attorney, Agent, or Firm*—Todd S. Parkhurst

[57] ABSTRACT

A priority ordered multiple video object display system is disclosed for use with a raster scan display having a plurality of display locations on a plurality of display lines. The display system comprises means for generating a list of ordered video object data packets, and buffer means for storing the list of ordered data packets at locations spatially associated with respective display locations. Also included are means for varying the order in which the packets are written into the buffer means, and means for selectively suppressing zero overwrite for secondary writes to a single location in said buffer means during the construction of a common single display line stored within said buffer means. A method of presenting a video display is also disclosed.

33 Claims, 38 Drawing Figures

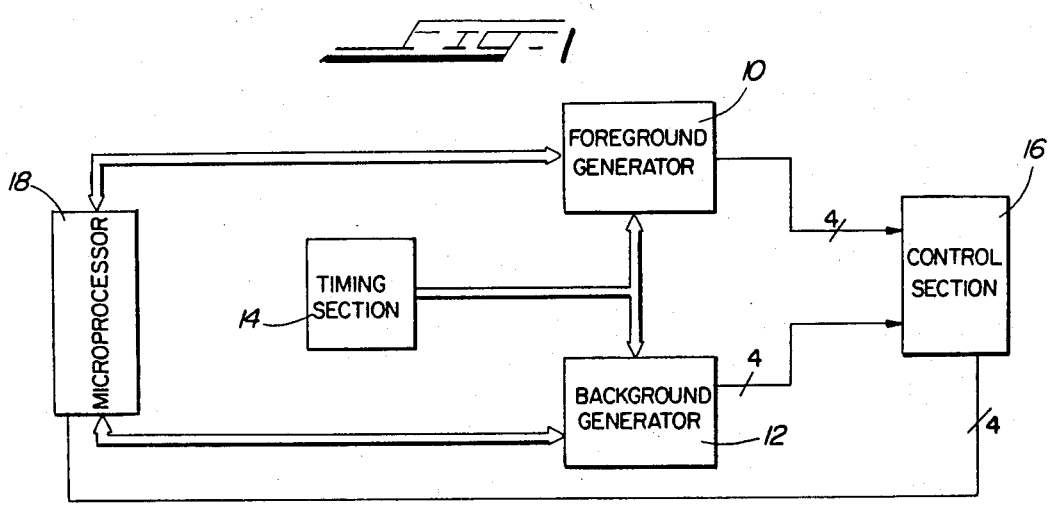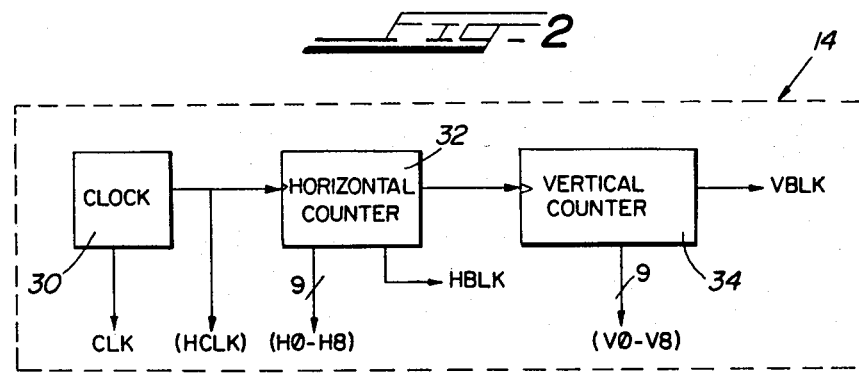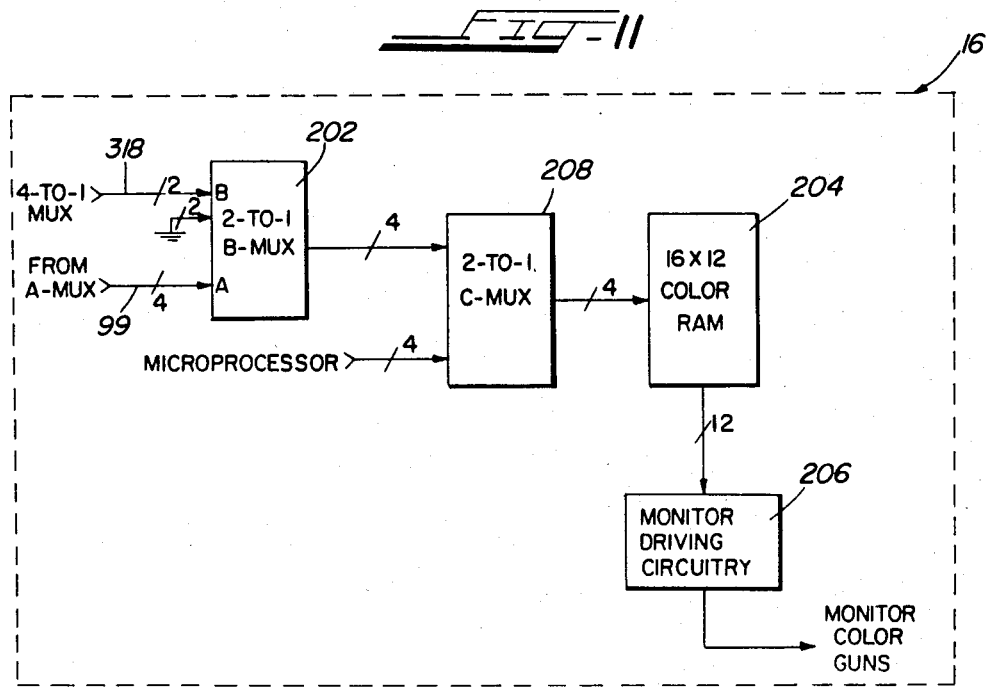

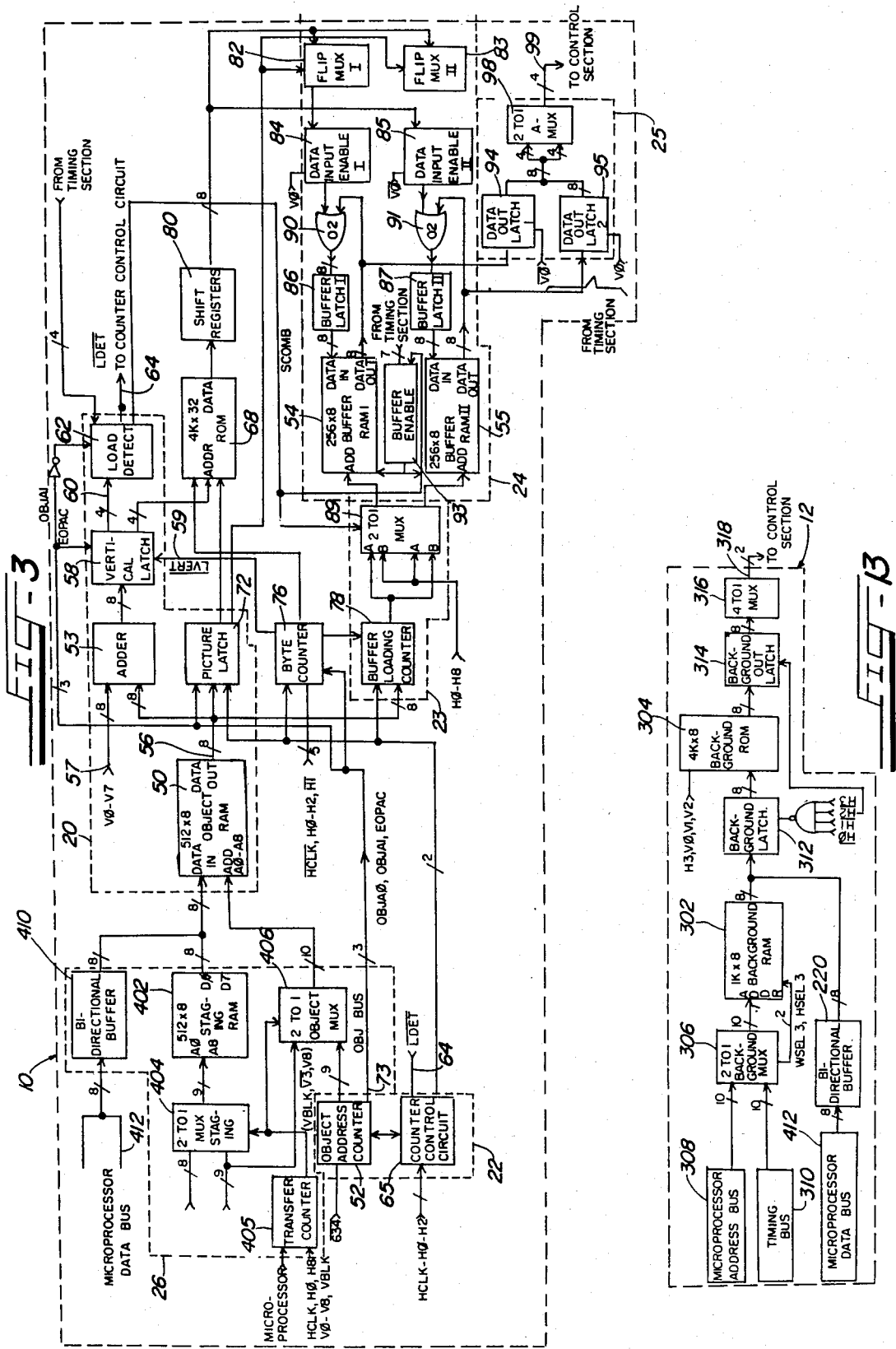

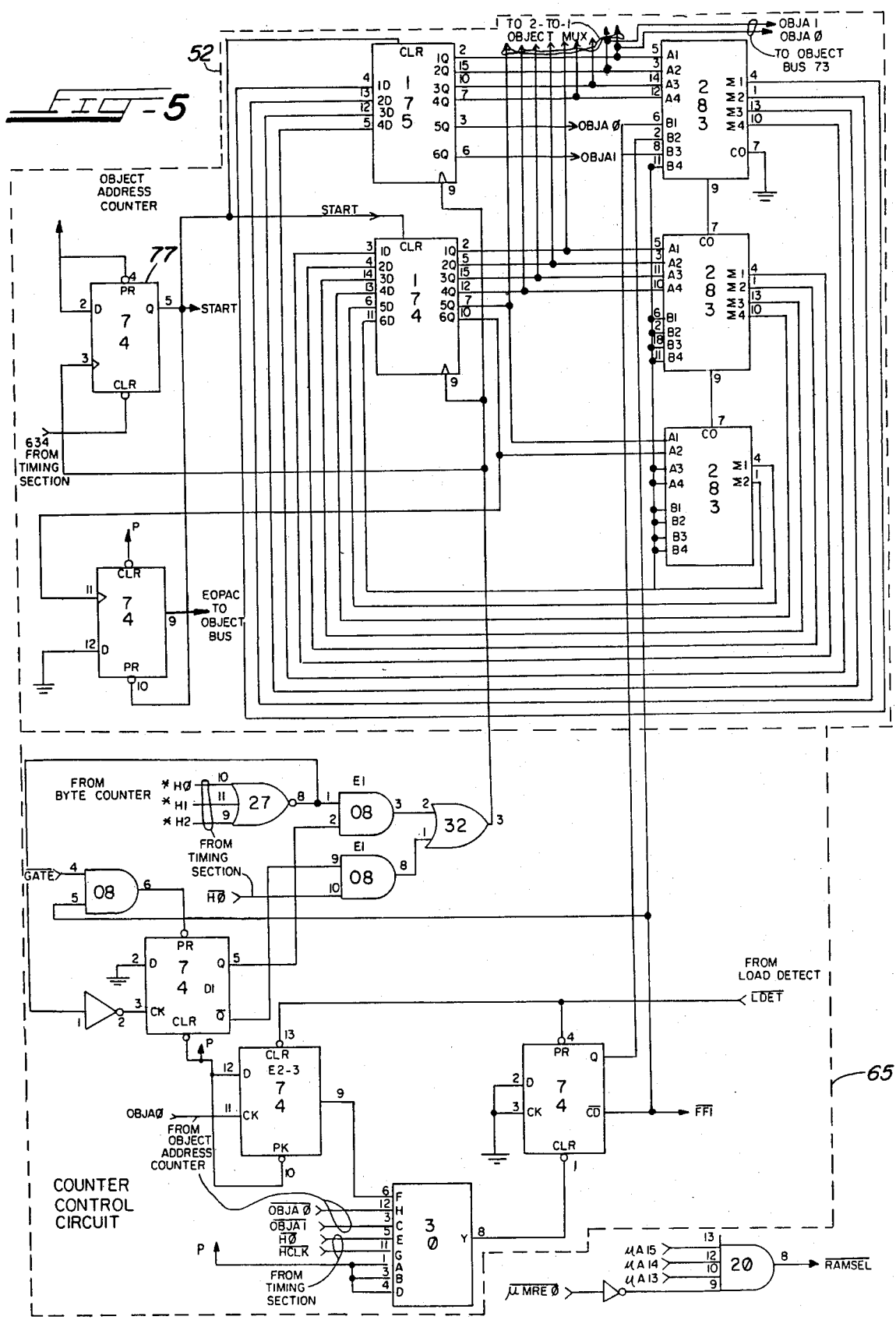

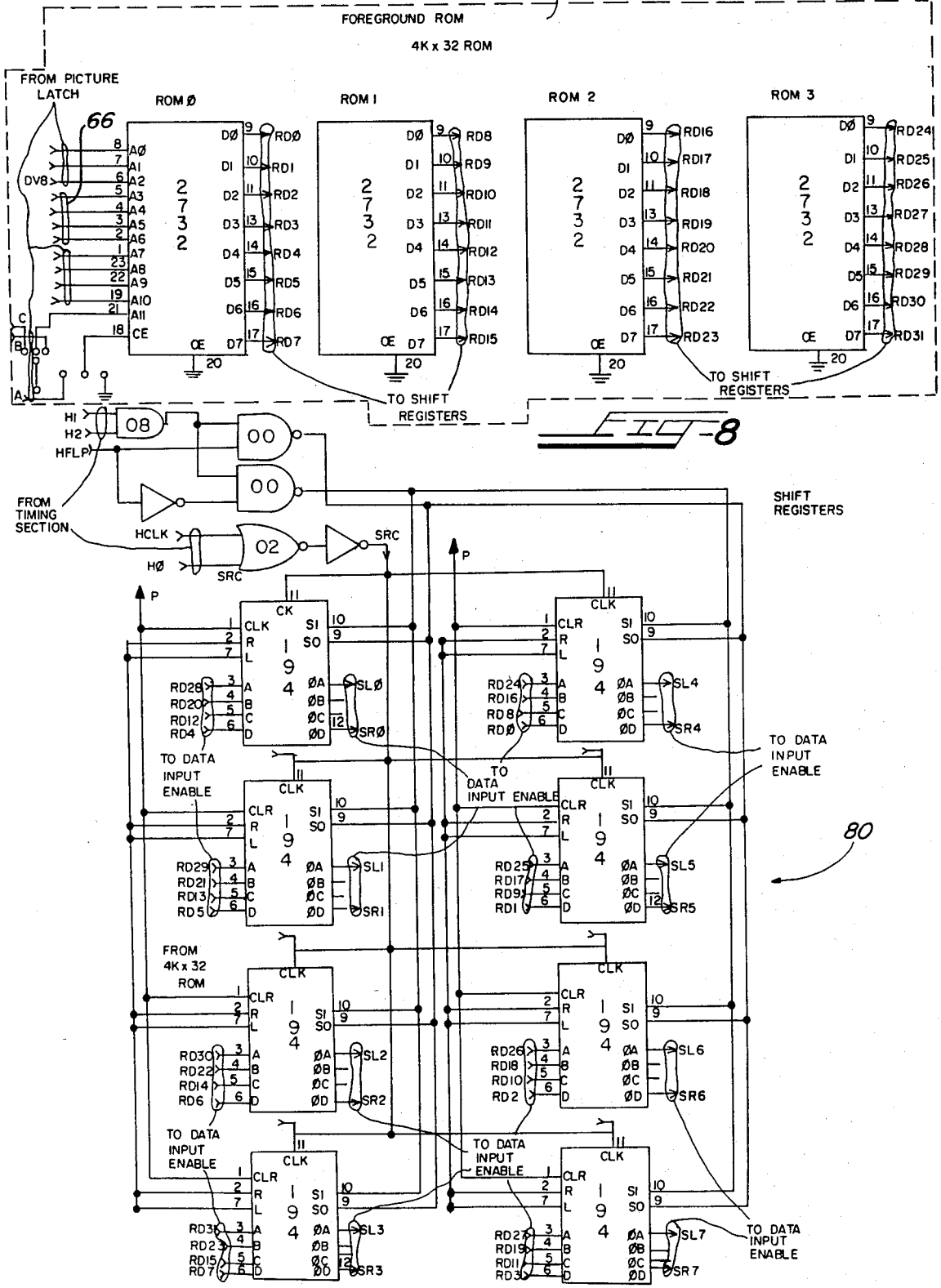

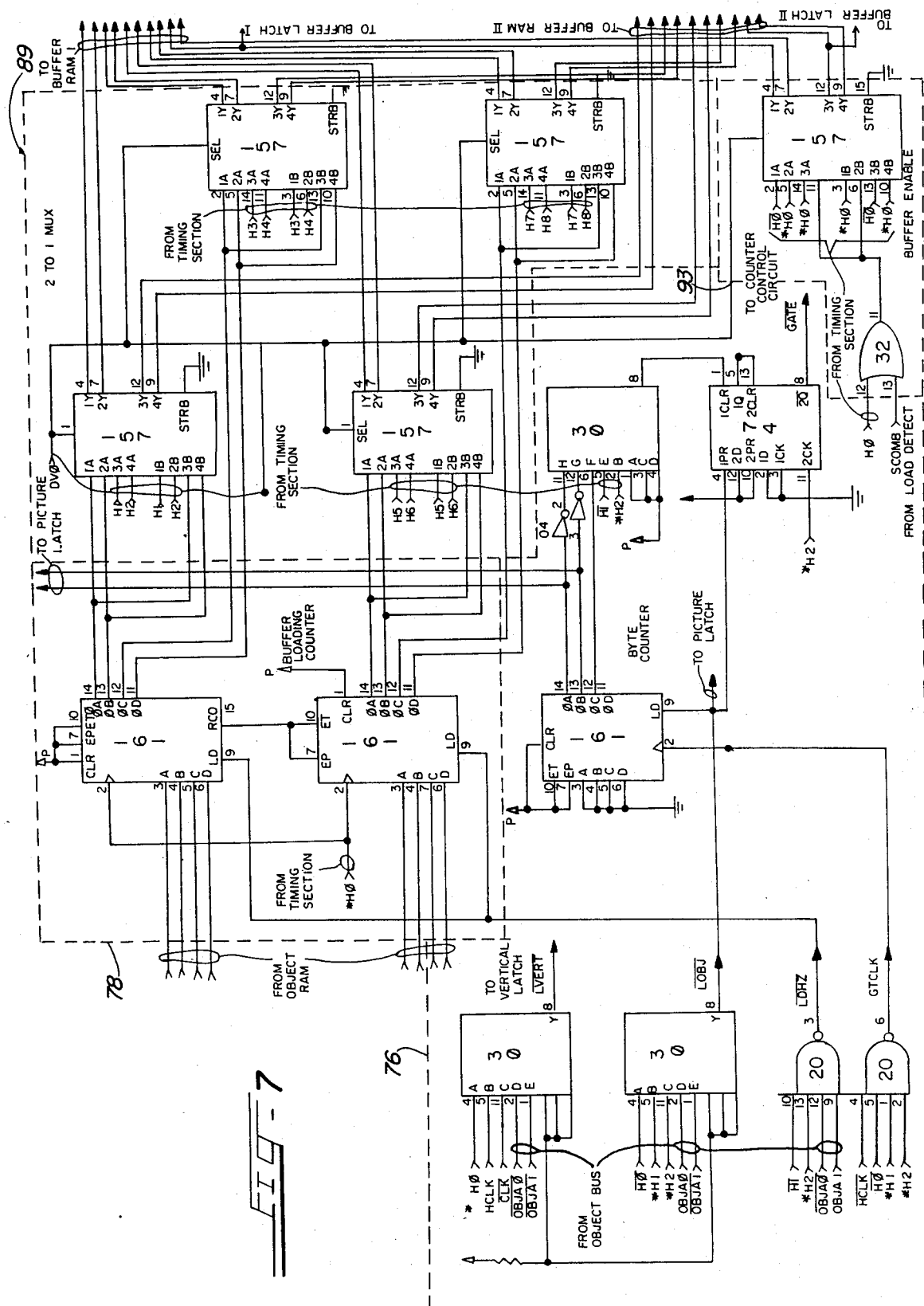

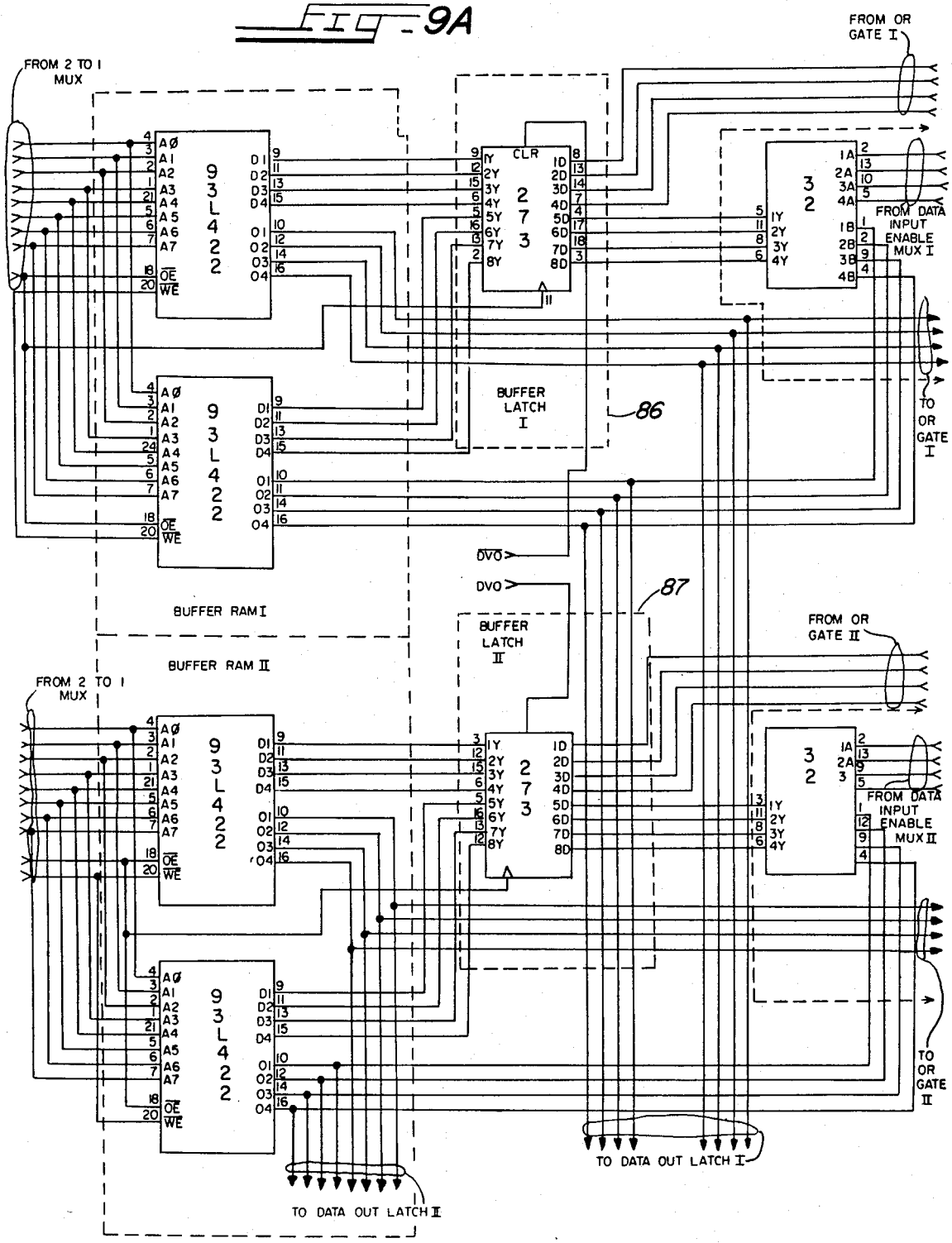

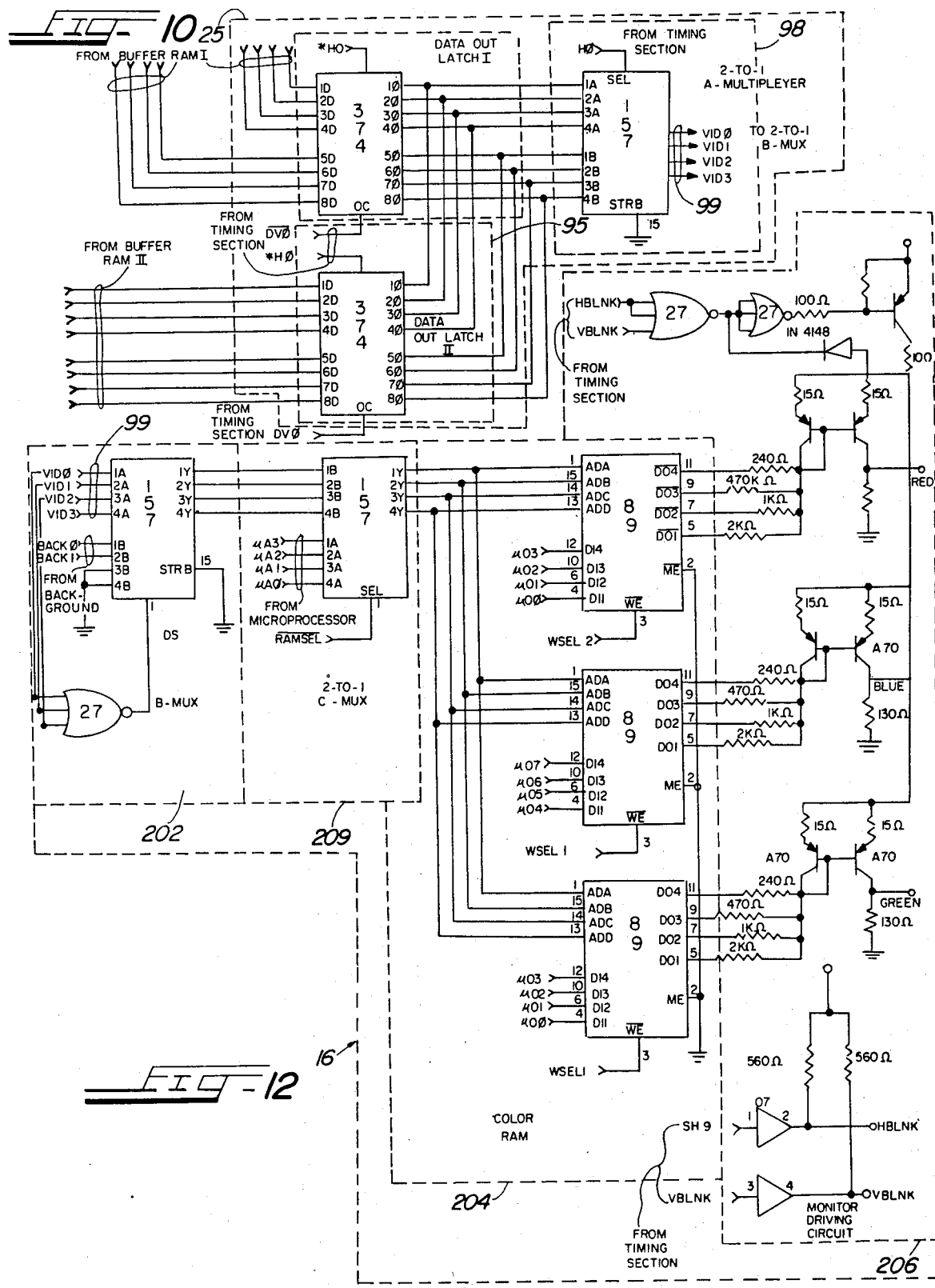

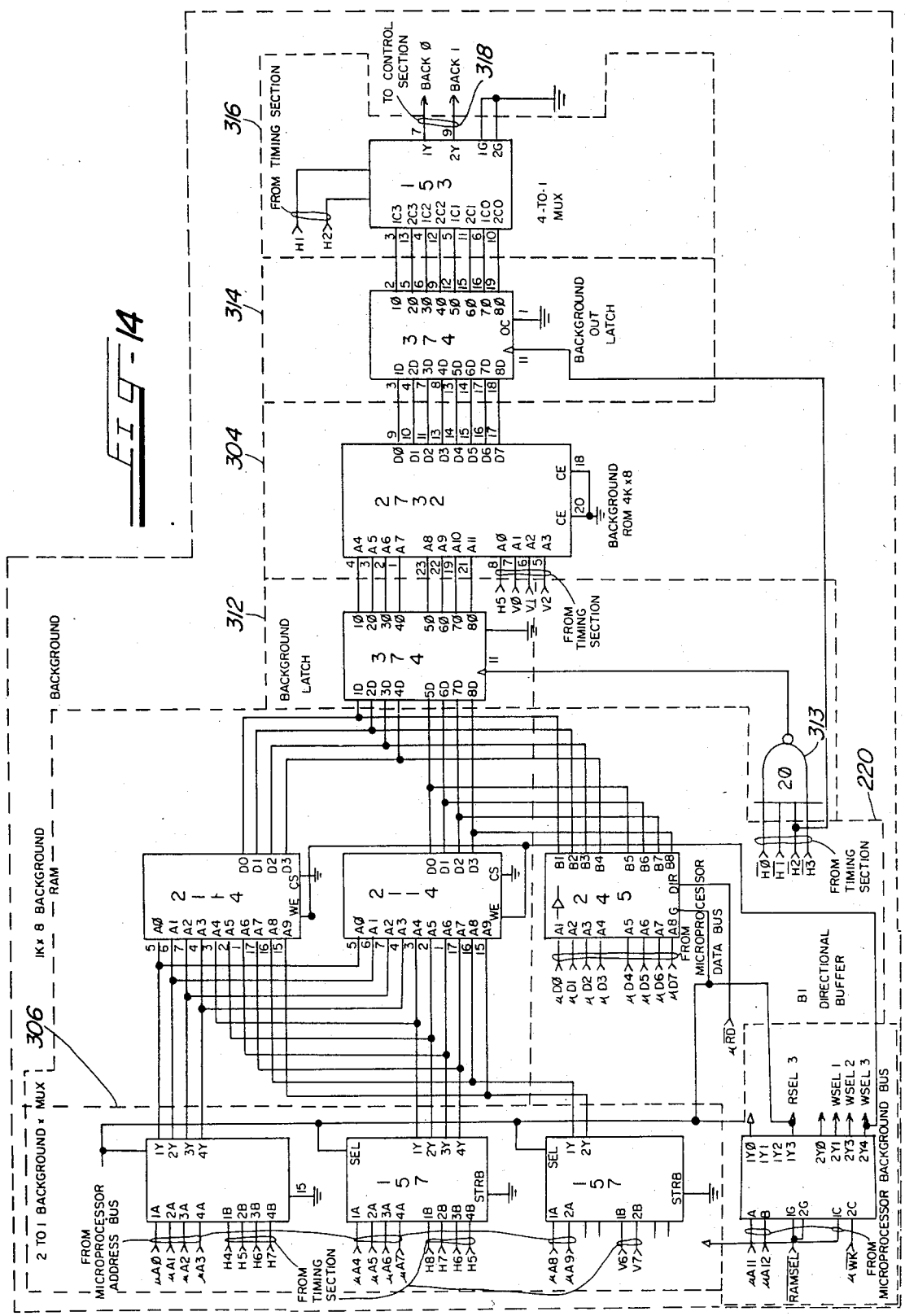

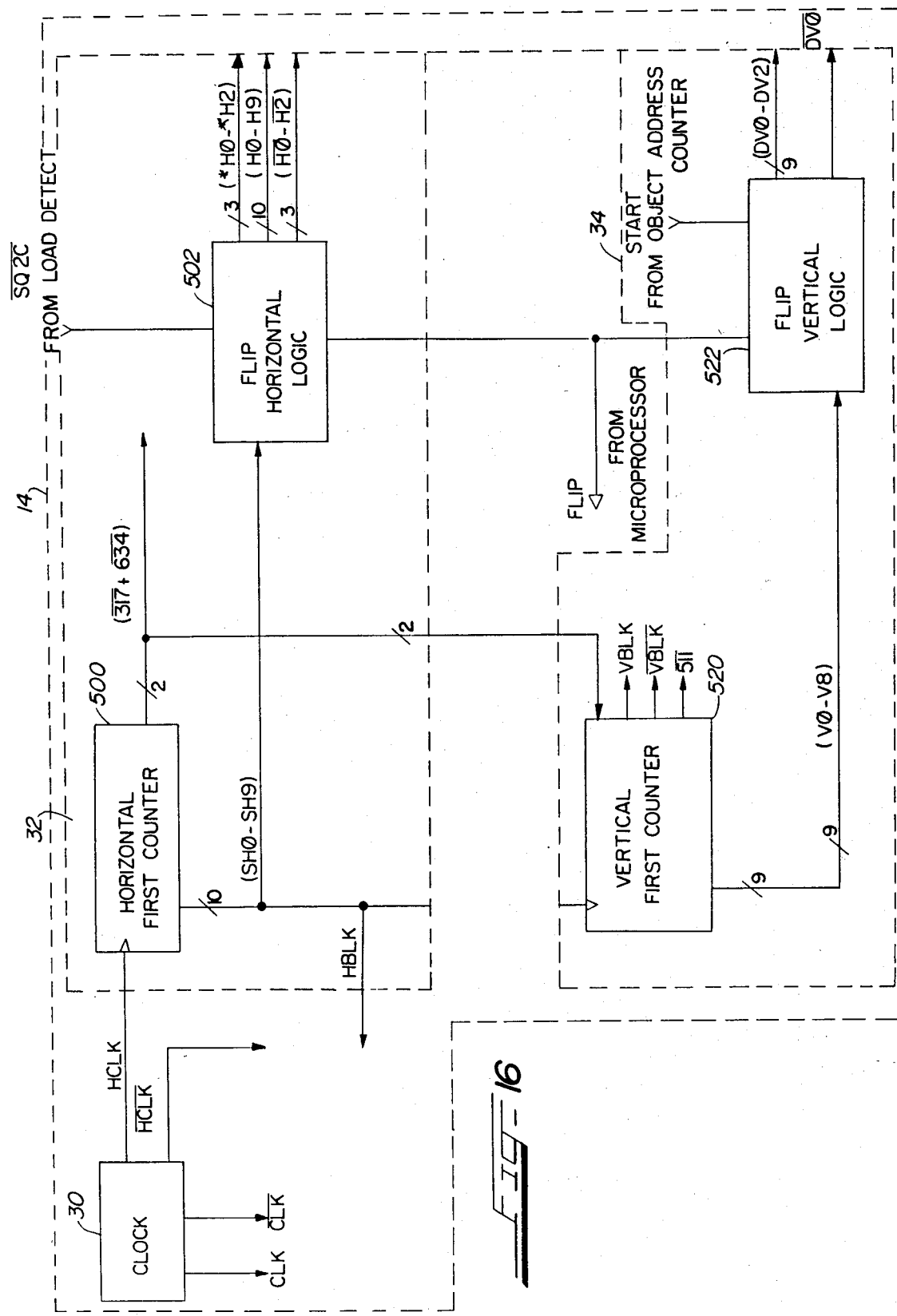

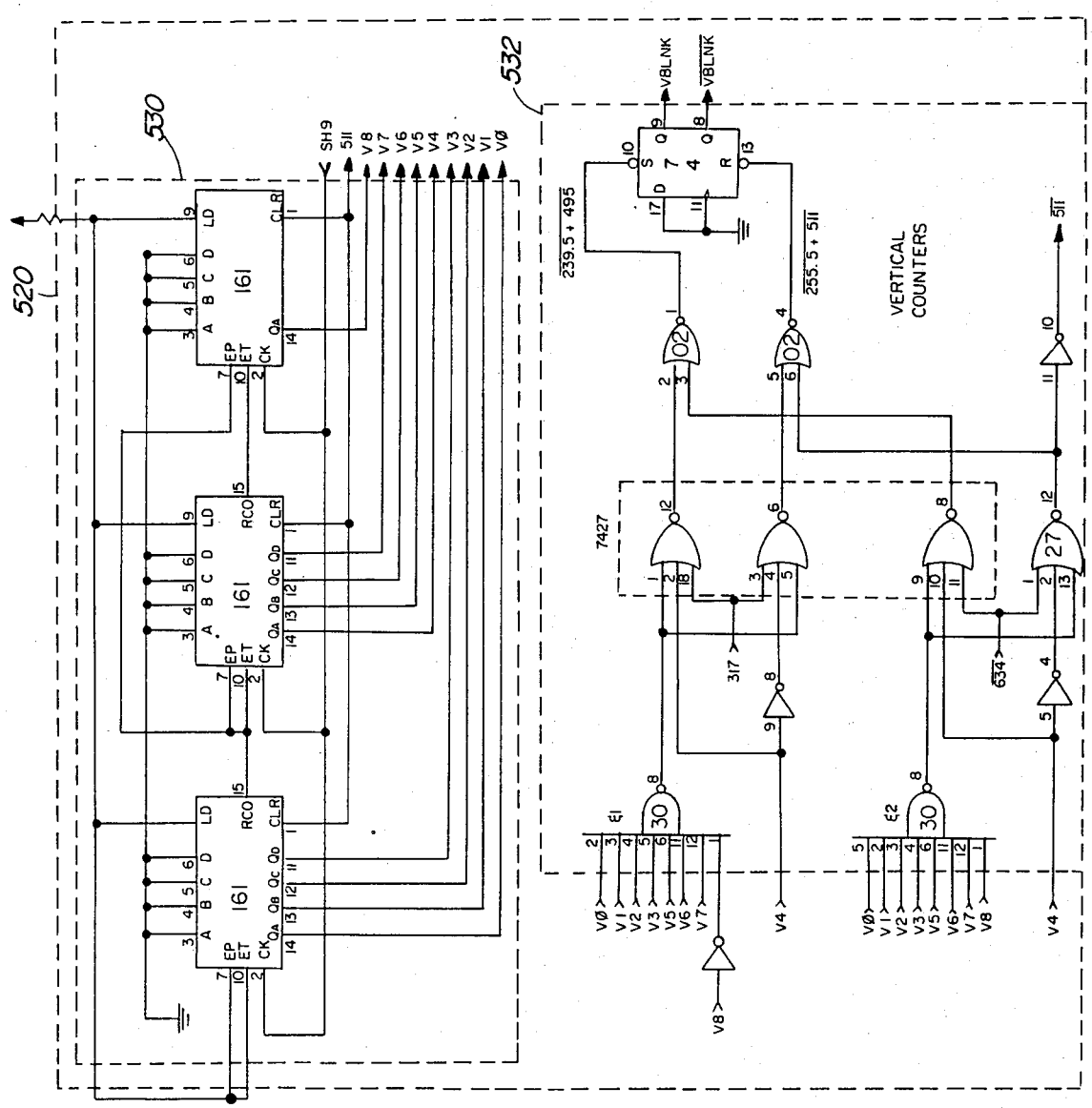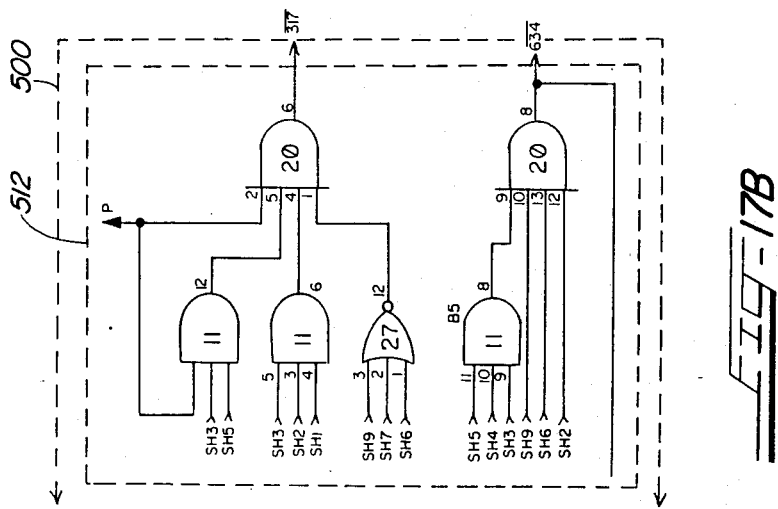
FIG-17B

OBJECT 1 810
OBJECT 3 820
720   F.G. ROM 770
811
821

PRIORITIZED OVERLAY OF FOREGROUND OBJECTS LINE BUFFER SYSTEM FOR A VIDEO DISPLAY SYSTEM

BACKGROUND OF THE INVENTION

This application is a continuation-in-part of co-pending U.S. patent application Ser. No. 294,438, filed 8/20/81 entitled "A Line Buffer System for Displaying Multiple Images in a Video Game" by Atish Ghosh and John Pasierb and now U.S. Pat. No. 4,398,189.

This invention relates to the display of video images in the context of electronic video amusement games.

The growing sophistication of video games increasingly requires the display of large numbers of moving objects in a video display. Also, now that color monitors are commonly used, game displays require complex background patterns over which the moving objects move during game play.

Modern video games are frequently designed for microcomputer control. Currently available microcomputers have limited computational power which may readily be overwhelmed by the simultaneous demands of game calculations and display control. Such demands have in the past been met with the use of high speed general purpose computers. The high cost of such computers, however, makes their use impractical in commercially viable video games.

Recent developments in the video game art have been directed to the design of hardware that tends to relieve the game microcomputer from its display control responsibilities. The game microcomputer is then available for game associated computations to the extent that it can delegate the supervision and control of the game display to the display hardware. On the other hand, the display hardware "steals time" from the microcomputer to the extent that the hardware must communicate with the microcomputer and to the extent that the hardware requires microcomputer supervision.

One example of a proposed use of dedicated display hardware is provided by Mayer, et al., U.S. Pat. No. 4,112,422. In Mayer the microcomputer specifies to a separate display circuit the objects that are to be displayed and the display positions of the objects. The display circuit then generates a signal suitable for use by a home TV receiver utilizing counters which are activated when the display positions of the various objects are reached. The design requires one counter for each object to be displayed.

It is evident that the circuitry taught by Mayer, et al., necessarily increases in size, complexity, and expense as the number of objects displayed increases. The Mayer circuitry also requires that the microcomputer operate "in step" with the display circuitry. The display circuitry is not, therefore, substantially "transparent" to the microcomputer operations. The freedom of the microcomputer to perform game computations is also thereby severely limited.

Some of the disadvantages of Mayer, et al., might be obviated by the system of Chung, U.S. Pat. No. 4,177,462. Chung's display circuit utilizes display controllers which act upon data supplied by the microcomputer. Each controller is indicated as having the capability of controlling up to 16 objects and putting a substantially single color background between each pair of objects. The objects are displayed on the basis of data supplied by the microcomputer which must, in turn, interrogate the display circuitry to obtain some of the game computational logic from a replaceable cartridge ROM in the display circuitry.

Chung's display circuit, at best, gives the microcomputer only limited relief from duties that steal time that would otherwise be available for game-associated calculations. The microcomputer is required to be inactivated whenever communications occur between the microcomputer and the display circuitry. A further disadvantage of the Chung design is that it requires the use of content addressable memories which are special purpose devices and tend to be costly. It would be much more desirable for commercial reasons to build circuits using readily available low cost devices in the design of circuitry for arcade games.

SUMMARY OF THE INVENTION

A feature of a preferred embodiment of the present invention is the rapid composition of a single horizontal line of a picture on the basis of minimal information from the game microcomputer. The passing of information from the microcomputer to the display circuit may then be completed in a very short period of time by a quick "handshake" operation. Except during the handshake period, which may take place at any time during the display cycle, the microcomputer and display circuitry operate independently of each other.

The game display may have representations of objects to be displayed stored as blocks of digital data in a permanent memory means. Some of the blocks of data may be representations of a single object in a sequence of different orientations. Sequential preparation to a viewer of the different orientations in successive pictures would then provide an illusion of a single rotating object. Because of the flexibility of the display circuitry it is only necessary to store representations of rotations through a single quadrant. That is, the circuitry can display the 360° rotation of the point of an arrow about an axis if representations of the arrow pointing straight up, 90° to the right, and sufficient positions in between to give the illusion of smooth motion are contained in the permanent memory. The display circuitry is capable of inverting one or both orthogonal axes of presentation in order to generate the three remaining quadrants.

The circuitry may also utilize a permanent memory means to store background information in the form of blocks of digital data.

An embodiment of the invention provides means for determining which bits of data from the object, or foreground, memory means, and the background memory means are required for the composition of each horizontal line of a raster scan video display. Having made the determination, a transfer means then begins loading the buffer means with the digital data required by forthcoming horizontal lines. Loading of the buffer means begins just prior to the commencement of the display of a single picture and continues throughout the display of that picture. Meanwhile output means cause the buffer means to begin outputting a data stream for controlling the video presentation.

Control means are provided for controlling the picture on a color monitor using the information provided by the output data stream. The specific embodiments envisioned herein may utilize the data stream signals to control directly the voltages applied to the color and intensity terminals of a color gun in the monitor.

In a particular construction described herein, the buffer means comprises a pair of buffer memories which may be used for alternate lines. Thus, while one buffer is outputting a data stream for controlling the color monitor for the line currently being drawn on the video screen, the other buffer is being loaded with data for the following line. It is, of course, not a necessary feature of the invention that only two such buffers be used. An alternate construction may make use of a larger number of buffers or, for example, a dual-port memory. Considerations of speed and economy will often suggest the particular devices to be used to implement this invention at any particular stage of development of the electronics art.

In an alternate embodiment, multiple digital data packets representing a plurality of objects each having display picture segments can be written into a single buffer location corresponding to a single display picture with ordered priority to achieve a selectively overlayed multiple object picture. The first packet to be written into a buffer location is written in its entirety. Non-display areas of each subsequent packet to be written to said buffer location can be suppressed to avoid overwriting into the buffer with non-displayable data. The priority of ordering of the data packets in the foreground memory can be made inversely or directly proportional to the addressable location of a data packet within the foreground memory relative to the address origin. (See FIGS. 20-26 and discussion thereof for further detail.)

In another embodiment, the digital data for storage in the buffer means is particularly characterized as including color group data representative of a selection and assignment of a particular color group to all pixels within a picture character block of buffer locations. This color group data is in addition to the pixel display data coupled from said foreground memory. (See FIGS. 24-26).

It is accordingly an object of this invention to provide a display circuit and method which is substantially transparent to the game control microcomputer, thereby permitting the display circuitry and microcomputer to operate substantially independently of one another. It is a further object of this invention to provide a circuit and method capable of composing a high resolution picture showing a very large number of colored objects on a colored background on the basis of minimal instructions from a game-control microcomputer.

Another object of the present invention is to provide a simple and economic method for presenting and manipulating large numbers of objects on a video screen in the play of a game.

Another object of the invention is to provide a "flip" feature for a video screen display whereby a single picture or a single object may be inverted, or the mirror image of the picture or object presented, or both.

These and other objects, advantages, and features of the invention, as well as many of the particular advantages, will become readily apparent from the following detailed description of one specific construction of an embodiment which is presented in conjunction with the accompanying drawings.

BRIEF DESCRIPTION OF THE DRAWINGS

With reference to the accompanying drawings:

FIG. 1 is an overall functional block diagram of a specific construction of a preferred embodiment following the teachings of the present invention.

FIG. 2 is a functional block diagram of the timing section shown as a block in FIG. 1.

FIG. 3 is a functional block diagram of the foreground generator shown as a block in FIG. 1.

FIG. 5 is a circuit diagram of a specific construction of the object control section shown as a logical subsection in FIG. 3.

FIG. 6 is a circuit diagram of a specific construction of the foreground ROM shown as a logical block in FIG. 3.

FIG. 7 is a circuit diagram of a specific construction of the object loading section shown as a logical subsection in FIG. 3.

FIG. 8 is a circuit diagram of a specific construction of the shift register shown as a logical block in FIG. 3.

FIGS. 9A and 9B are a circuit diagram of a specific construction of the buffer section shown as a logical subsection in FIG. 3.

FIG. 10 is a circuit diagram of a specific construction of the output section shown as a logical subsection in FIG. 3.

FIG. 11 is a functional block diagram of the control section shown as a block in FIG. 1.

FIG. 12 is a circuit diagram of a specific construction of the central section shown as a functional block diagram in FIG. 11.

FIG. 13 is a functional block diagram of the background generator shown as a block in FIG. 1.

FIG. 14 is a circuit diagram of a specific construction of the background generator shown as a functional block diagram in FIG. 13.

FIG. 16 is a detailed functional block diagram of the timing section shown as a simplified schematic in FIG. 2.

FIGS. 17A and 17B show a circuit diagram of a specific construction of the timing section shown as a functional block diagram in FIG. 16.

DETAILED DESCRIPTION

Figure 4A:
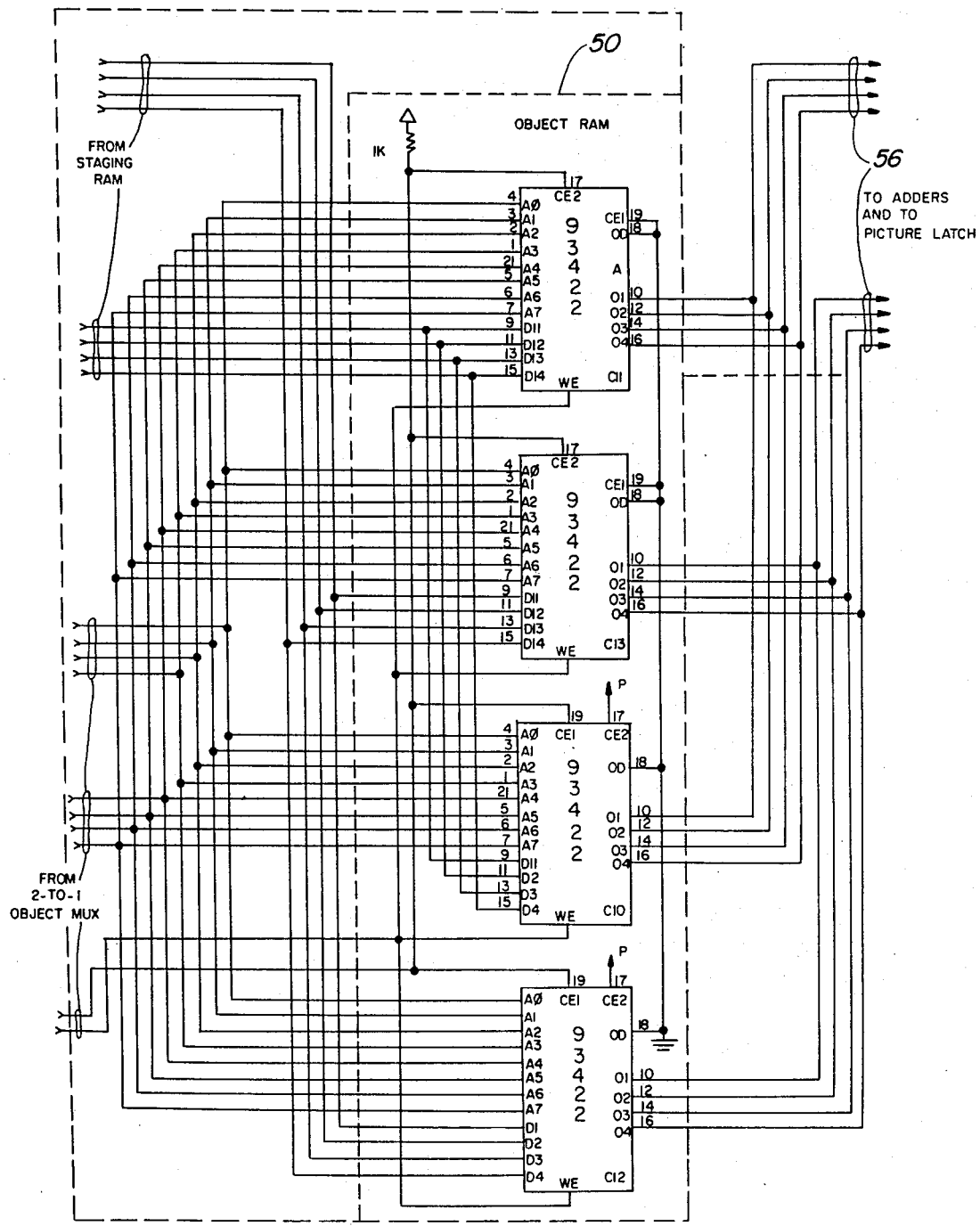
FIGS. 4A and 4B show a circuit diagram of a specific construction of the object section shown as a logical subsection in FIG. 3.

A specific construction of an embodiment of the present invention is a double line buffer for use with a raster scan color video monitor. FIG. 1 shows schematically the logical operation of the specific construction.

The double line buffer comprises a foreground generator 10 and a background generator 12. In the illustrated embodiment, the foreground generator is block oriented and is also capable of displaying 128 individual, independent objects. The background generator is also block oriented and may display selections from 256 different blocks. Foreground and background ROM's providing permanent memory means within the respective generators are programmed with information to control the display. The foreground and background generators are controlled by a timing section 14. The generators output their data into a control section 16. A microprocessor 18 governs overall operation of the system.

The timing section 14 includes a system clock and counters. The system clock 30 runs a 10 bit horizontal counter 32, as shown in a simplified schematic, FIG. 2. The horizontal counter counts from 0 to 511 during active video scan and from 512 to 634 during horizontal retrace. "Active video scan" is the time during which a horizontal line is actually being traced on the monitor face.

When the horizontal counter 32 reaches a count of 634 the counter resets itself to zero. Each time a count of 512 is reached, a nine bit vertical counter 34 is incremented. Each horizontal count causes the monitor to draw one horizontal pixel on the screen, except during horizontal blanking, by means that will be described in connection with the "flip" features. Each vertical count commences the drawing of one horizontal line by means also to be described in connection with the "flip" feature, except during vertical blanking. Successive horizontal lines are drawn one below another, as the monitor is normally viewed.

The vertical counter starts at 0 and counts to 239 during active video. The video is blanked for retrace for 16 counts commencing with count 239.5, and a second active period starts on a count of 255.5. Blanking again occurs on count 495 for another 16 counts. On count 511 the vertical counter is reset to 0 and the cycle recurs. The half line count is obtained by detecting the 317th horizontal count.

The horizontal lines during the second active period, or trace, are interlaced between the lines drawn during the first active period. The first trace thereby draws a field of the odd numbered lines; the second trace draws a field of the even numbered lines. The two interlaced fields or traces together comprise a single "frame" or "picture." The display resolution will be 512 pixels per horizontal line and there will be 479 interlaced lines.

A more detailed exposition of the timing section will be given in connection with the "flip" feature.

The foreground generator contains two RAM buffers. Each RAM buffer is capable of holding information for one horizontal, or scan, line. The buffers work as complements of each other. One buffer alternatively unloads its information to the screen on one scan line while the other buffer is loaded with the data for the next scan line. Each scan line is digitized by division into 512 "pixels."

The background video display area for the illustrated system is made up of an array comprising blocks 32 pixels wide and 16 lines high. Each block can be individually specified by a programmer to be any one of 256 available pictures.

A foreground is created by positioning object data in a display buffer at ordered locations having respective associated spatial display locations. The foreground data, if present, is given priority over the background data present in a background memory in determining the picture to be displayed. If no foreground data is present, such as can be indicated by an all zero, 1, or other code, the background data is instead determinative of the picture to be displayed. In either event, the data determinative of the picture to be displayed is passed to the circuitry for converting said data to signals compatible with driving a raster scan display system.

Figure 4B:
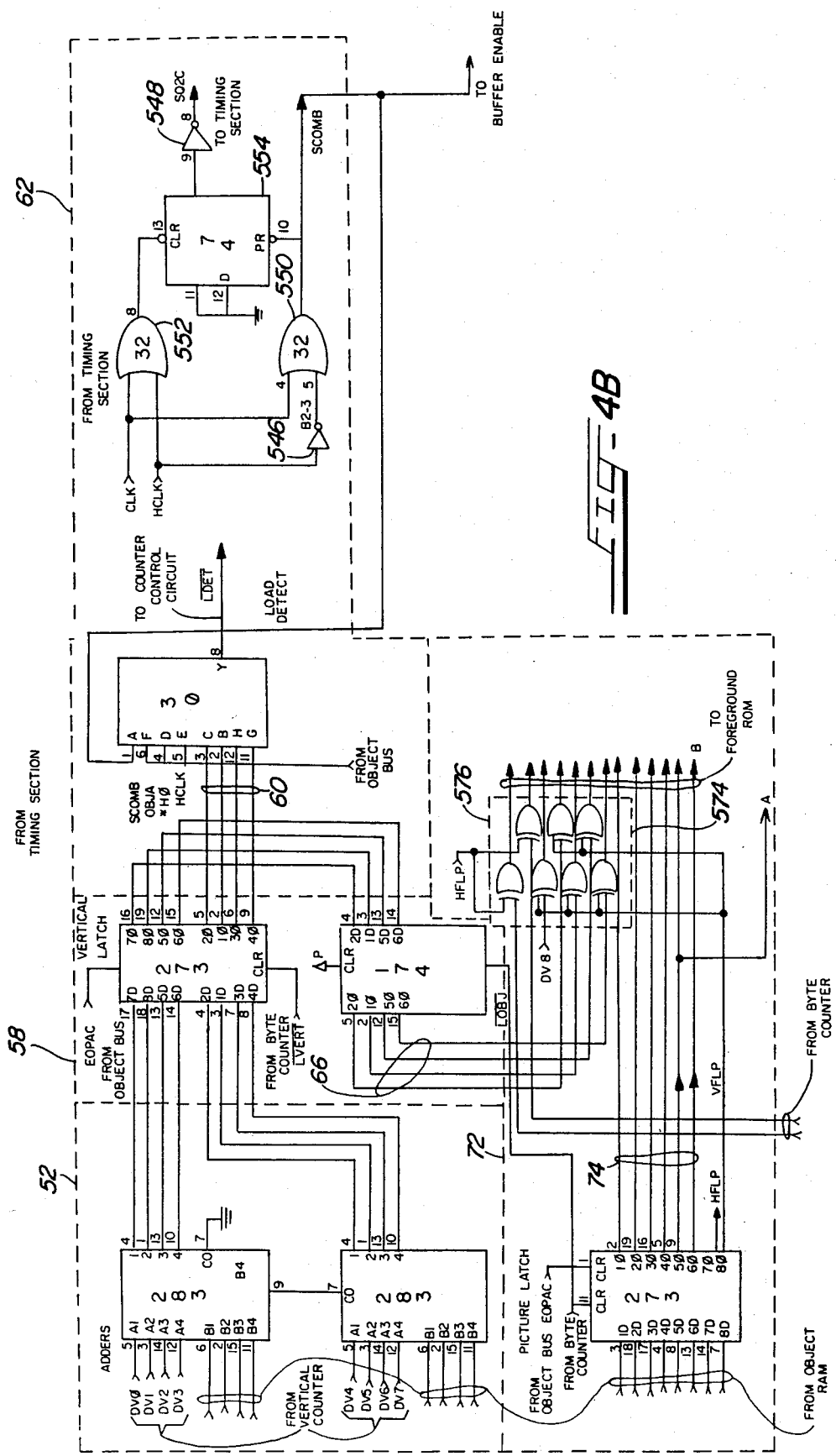

As shown in the illustrated embodiment of FIGS. 3 and 4, the foreground generator 10 is comprised of an object section 20, which provides storage and readout for object packages to be used in the composition of the display. A specific construction of the object section is shown in FIG. 4. The object packages are stored in an object or foreground RAM 50. Each object package comprises four words of information. The first word of the package contains a starting vertical position. The second word contains a picture number (or index) and an HFLP and a VFLP indicator. The third word contains a starting horizontal position. The fourth word is a color group which provides a selection of 1 of a plurality of color mappings to be associated and stored with the high priority determinative video data in the buffer.

The foreground object RAM memory 50 contains the data describing the location on the screen of each of the foreground objects.

The foreground memory 50 is a read-write memory. As described above, each object package is comprised of four words of information, comprising a block. Thus, each block boundary is four-word locations further in memory. Thus, for the example where each word is in eight-bit byte, 32 bits of data are passed for each object packet block. Addressing of the next block commences at four address locations subsequent to the starting address for the transfer of the previous object packet block. This is useful, for example, where a counter is loaded with the initial block starting address, and thereafter the counter sequences through the addresses for that block thereby freeing the host processor.

In a preferred embodiment, the ordering of the object packet blocks in the foreground memory 50 is determinative of a priority as among foreground object packet blocks containing identical vertical and horizontal spatial display association. In this embodiment, the system scans the foreground memory in sequential ascending order, and utilizes horizontal and vertical words from each object packet block to position the associated picture number at the appropriate spatially associated location in the buffer memory. Since, in the illustrated example, the list is scanned in ascending order, the location at which a block is stored in the foreground memory is inversely proportional to the priority of storage in the buffer. As the foreground list is scanned, a subsequent write to the same location overlays the displayable portions of a different object packet block on top of the originally written locations. The picture number enables the foreground object memory containing video data corresponding to the picture number to output said data for the line to be displayed to the buffer means for storage at the appropriate location therein. The object packet blocks contain video data for a plurality of pixels of display, many of which have no display associated therewith. In the preferred embodiment, non-display data detection is provided to suppress overwrite of such data to corresponding buffer locations. Thus, the overlay benefits of FIGS. 22 A–B are achieved.

In the illustrated embodiment, the object RAM 50 comprises four 256×4 Fairchild 93422's addressed in pairs. A read at a single address location thereby causes the RAM to output one byte of data. Four sequential address locations constitute the data for a single object. In the specific illustrated construction, the RAM can store 128 objects at any time. The present invention also encompasses other constructions which may have a greater or lesser number of objects, and use more or less than eight bytes of storage per object.

In an alternate embodiment, a 32 bit wide foreground memory 50 is utilized to provide for single-cycle output of entire object packet blocks. Other variations can also be utilized in accordance with and complimentary with the present invention.

As shown in FIG. 3 and FIG. 5, an object control section 22 in the foreground generator 10 which provides control for reading object packages out of the object RAM 50. An object address counter 52 in the object control section is a nine bit counter which addresses the object RAM locations. This counter is set to zero at the start of every horizontal scan line.

The object address counter starts at the address of the first object package and counts in steps of 4 in order to determine from the vertical position byte of each package whether an object is to be loaded into one of a pair of RAM buffers 54 and 55 during the current scan line.

The most significant bit of the nine bit vertical counter may be used as a frame counter to count whether the frame is odd (0 to 239.5) or even (256 to 495). The vertical counter will thereby be an eight bit counter for each frame which counts downward starting from zero at the top of the screen. The vertical position in each package, however, is specified in the object RAM 50 by counting lines upward starting from zero at the bottom of the screen, as the screen is normally viewed.

Testing to determine whether an object is to be placed in a buffer may therefore be accomplished by adding the vertical counter contents to the vertical position byte contents from the object RAM 50. When the two eight bit quantities are added, the four most significant bits become "ones" 16 scan lines before all eight bits become "ones." This condition occurs once in the even frame and once in the odd frame. A test for all "ones" in the four most significant bits therefore permits the object to be placed in one of the buffers 54 or 55 during drawing of 16 horizontal lines before the object's lowest horizontal position line is drawn.

Addition is performed by an adder 53, in an object section 20 which is fed by the least significant eight bits 57 from the vertical counter and the output 56 of the object RAM 50 which comprises one of the starting vertical position bytes. The adder outputs into a vertical latch 58 which is clocked by signals on an LVERT* line and cleared by EOPAC pulses from the object address counter 52. The vertical latch 58 in turn outputs the four most significant bits 60 into a load detect circuit 62. The load detect circuit, which is a NAND gate in the specific construction illustrated in FIG. 4, enables a counter control circuit 65 when the load detect's input is all "ones," emitting a low logic signal on an LDET* line 64. The "*" in "LDET*" corresponds to the superior horizontal lines in the figure and indicates that a high logic signal is normally carried on that line. Additional inputs originating from the timing section 14 and the object address counter 52 gates the load detect signal for 25 ns. at the end of alternate HCLK pulses, as will be described.

FIG. 6 is a circuit diagram illustrating a specific construction of the foreground ROM 68. The four least significant bits 66 from the vertical latch 58 output address terminals A3 through A6 of the foreground ROM 68, and are incremented by one unit at the start of each horizontal line. Terminals A3 through A6 thereby point to successive groups of eight addresses in the foreground ROM. Each group represents data for one horizontal line of a picture.

As illustrated in FIG. 5, the counter control circuit 65 is in object control section 22, and is used to control the frequency and increment size of the object address counter 52. At the start of each horizontal scan the control circuit causes the object address counter to count in 200 nanosecond (ns). steps of 4. When the load detect circuit 62 determines that an object has to be loaded into the buffer it outputs a low on the LDET* line 64 to the counter control circuit, as already described. The counter control circuit 65 switches the count sequence of the object address counter to steps of 1 so that successive bytes of data may be retrieved from the object RAM 50. At the same time the time between steps is increased to 800 nanoseconds to provide time for each object to be loaded into the buffer. As illustrated in FIGS. 26A–G, this time can also be different, such as 400 ns. The slower counting rate obviates the possibility that the hardware might attempt to load a second object into the buffer before loading of the first one is complete. Once an object has been loaded into the buffer, the counting rate increases to provide for 200 nanosecond steps of 4.

As the object address counter 52 begins to count in steps of 1, the second byte out of the object RAM 50 is the picture number of the object being loaded into the buffer. The picture number is latched into a picture latch 72 by an LOBJ* signal generated from signals from the object address counter 52 on an OBJ bus 73, as will be described. The picture number now comprises the upper address lines 74 to the foreground ROM 68. The upper address lines 74 address the block of memory where the representation of the particular picture corresponding to the picture number is stored. A byte counter 76 in an object loading section 23, having a specific construction as illustrated in the circuit diagram, FIG. 7, is also enabled by the counter control circuit 65 when the picture number is latched. The byte counter addresses the two least significant digits of the foreground ROM, as shown in FIG. 4.

Count 512 in the object address counter is transmitted as a low on an EOPAC line in the OBJ bus 73, as shown in FIG. 5, to clear the picture latch 72. The latch is then enabled at the start of each horizontal scan when the EOPAC line goes high.

A flip-flop 77 in the object address counter outputs on a START line to reset the object address counter. The 634th count from the horizontal counter 32 is transmitted as a low to the flip-flop clear pin 77-1, causing the START line to go low. It will be recalled that the 634th count occurs at the end of horizontal blanking. As the horizontal counter starts counting out the next line, the clear pin 77-1 goes high and flip-flop 77 is enabled. The low on the START line resets the object address counter to zero, as may be seen from FIG. 5.

In the particular construction illustrated in FIG. 6 the foreground ROM is comprised of four Texas Instruments, Inc. 2732 ROM's. The four 4K×eight-bit ROM's are simultaneously addressed to provide a 4K×32 bit memory. Another construction of the embodiment may use 2764 ROM's to provide an 8K×32 bit, or larger, memory.

After the picture number is latched, the third byte, the horizontal position byte, is output from the object RAM 50. The horizontal position and successive bytes are loaded into an eight-bit buffer loading counter 78 during an approximately 3.2 microsec. interval, the time required to scan 32 pixels. During the loading the counter is clocked at one-half the pixel rate by rises on the line carrying the least significant count from the horizontal counter.

The byte counter 76 meanwhile counts out bits corresponding to one horizontal line of the picture stored in the foreground ROM 68 causing the ROM to read out the corresponding data. The count is from 0 to 3, addressing the two least significant digits of the ROM address. Counting is at the 800 ns. rate; the counter clears on the fourth count.

The third most significant digit of the ROM address is addressed by a DV8 line from the vertical counter which indicates whether the coming display is for an odd or even frame. ROM picture information for each picture is in the form of a set of words for one frame followed by a set of words for the second frame.

Figure 9B:
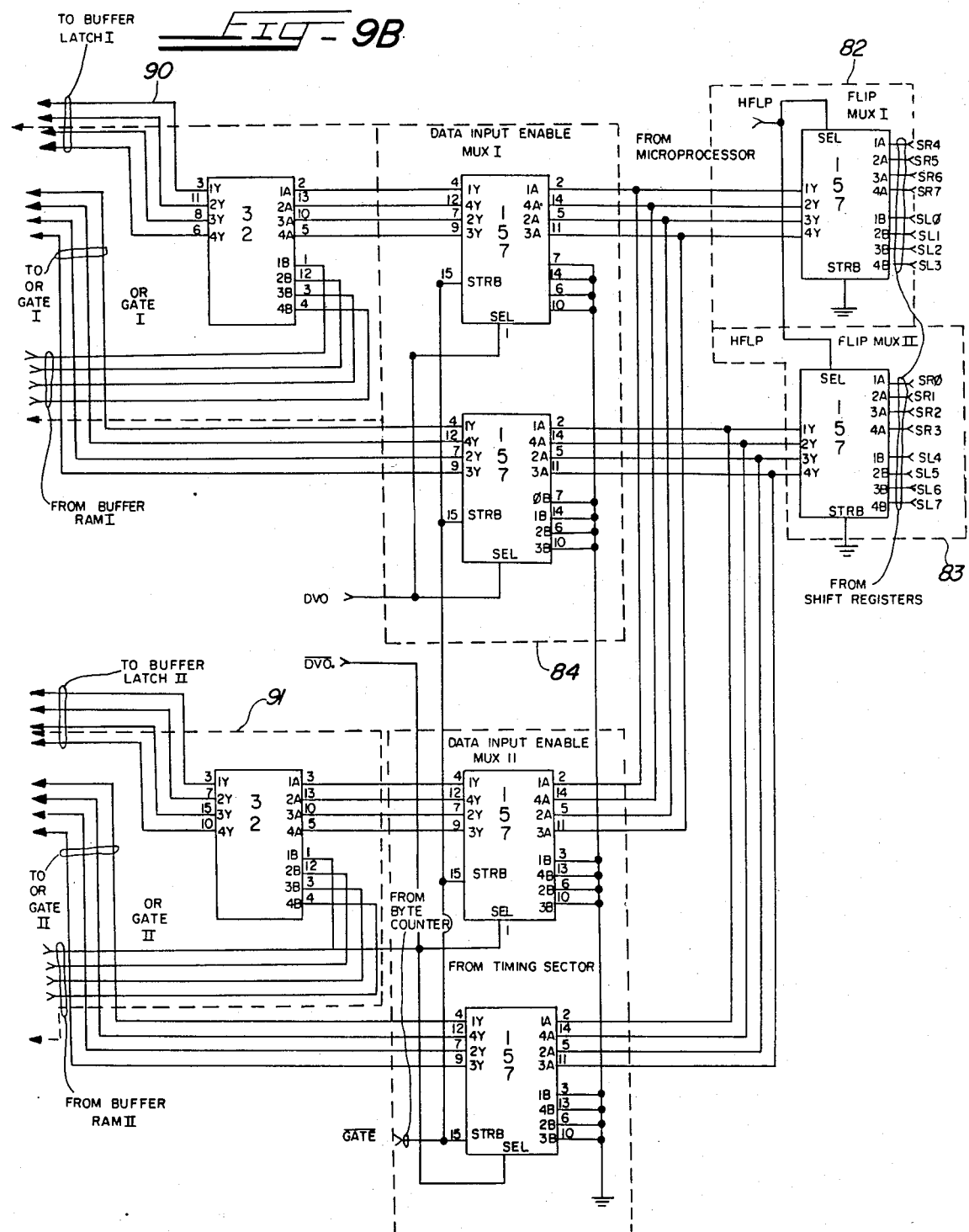

The data from the ROM 68 is read out in 32 bit words. Each word is first loaded into a set of shift registers 80. A specific construction of the shift registers is illustrated in FIG. 8. The word is shifted bit-by-bit through one of a pair of flip multiplexers 82, 83 and then through one of a pair of data input enable multiplexers 84, 85, which may have a specific construction as indicated in FIGS. 9A and 9B, illustrating a specific construction of a buffer section 23 of the foreground generator 10. The flip multiplexers implement a flip feature which will be described. The shift registers shift out the bits comprising the word at the same rate that the buffer loading counter 78 is counting. The bits are written into one of the buffer RAM's 54, 55 through buffer latches 86, 87. Picture information from the ROM is loaded into successive buffer locations, starting at the location specified by the horizontal position byte. The buffer loading counter 78 addresses the buffer RAM's through a 2-to-1 buffer multiplexer 89, shown in FIG. 7.

The shift registers 80, shift out each word, eight bits at a time. When all 32 bits have been shifted out to one of the buffers, the byte counter 76 increments the ROM 68 address and the next 32 bits are loaded into the shift registers. This process occurs a total of four times for one horizontal line of a single object, and a total of 128 bits of data are written into the buffer. Each pixel requires four bits of data; 32 pixels thereby comprise a single horizontal line representation of one object.

In an alternate embodiment, color group data is loaded into the successive buffer locations as an attachment to the picture information from the ROM so as to form a picture value comprising a color group subpart common to all pixels within an object packet block and a picture information value as output from the ROM. This increases color selection from the color memory. This of course increases the width of the buffer memory storage words to accommodate the increased storage per buffer location for the additional color group information for each location. Thus, in the specific illustrated circuitry as described hereafter, four-bit wide data words must be expanded to eight bits, and four-bit wide 2-to-1 multiplexers must be expanded to eight-bit wide, and so forth. However, in other regards, the functional aspects of this embodiment are consistent with the teachings herein and hereafter.

In one embodiment, each time data is loaded into one of the buffers 54, 55, data existing in the buffer is first read out and "OR"ed with the incoming data through one of a pair of OR-gates 90, 91; the result of the "OR"'ing is then latched into the corresponding buffer latch and read back into the buffer. The "OR"ing operation is performed to insure that when picture background information consisting of all zeros is written into the buffer, any object data already existing in the buffer will not be erased.

In another embodiment, zero writes are inhibited by zero detection circuitry. Read/writes out of or into the buffers are controlled by a buffer enable 93 which also clocks the buffer latches 86, 87. The time comes to output the data from the buffers at the beginning of each horizontal line. The 2-to-1 multiplexer 89 switches the buffer address lines of the selected buffer to couple to the output H0-H8 from the horizontal counter 30. Data coming out of the buffer is latched into one of a pair of data-out latches 94, 95 in an output section 25 of the foreground generator 10. A specific construction of the output section is illustrated in the circuit diagram of FIG. 10. As the horizontal counter counts from 0 to 511, the corresponding 512 bytes of data are sequentially read out of the buffer and zeros are written into the corresponding locations by holding all the data-in inputs to the buffer at zero and enabling the write-mode, thereby flushing the buffer. The flushing operation is necessary because the buffer has to be cleared of old data (previous horizontal line) before new data (upcoming horizontal line) can be entered.

Data is latched into one of the data-out latches 94, 95 eight bits at a time. A four bit 2-to-1 A-multiplexer 98 switches between the least and most significant four bits at the pixel rate to provide a four-bit wide data stream 99. The four bit output of the A-multiplexer makes up one-half of the input to a four bit 2-to-1 B-multiplexer 202 in the control section 16, as may be seen by reference to FIGS. 11 and 12. Background information may make up the other half of the input, as will be described. Whether the background or foreground is selected is determined by the foreground information. If, for example, the foreground data has all zeros in the least significant three bits, as may be deduced from FIG. 12, then the background is displayed, otherwise the foreground is displayed.

The data from the B-multiplexer 202 indicates an address in a color RAM 204 as illustrated in FIGS. 11 and 12. The color RAM is a fast bipolar RAM comprising sixteen 12 bit words. Each 12 bit word can be altered by the programmer and corresponds to a color, thereby providing for 4096 colors, sixteen of which may be displayed at any one time. As the data in the foreground/background combination changes, different locations are addressed in the color RAM and corresponding data outputted to monitor driving circuitry 206. The B-multiplexer 202 communicates with the color RAM 204 via a C-multiplexer 208. The C-multiplexer is a quadruple 2-to-1 multiplexer which permits the microprocessor to address the color RAM directly. The data from the color RAM is converted to voltage levels by a resistor network and a current mirror comprising the monitor driving circuitry and interfaced to the color guns of a color monitor. The B-multiplexer 202 communicates with the color RAM 204 through a 2-to-1 C-multiplexer 208.

The background generator's construction and operation may be understood by reference to FIGS. 13 and 14. The background display comprises an array of 32 blocks width by 30 blocks high. Each block is 16 pixels wide and sixteen lines high. The background display, however, may control the pixels in pairs, thereby decreasing the resolution of the background as compared with the foreground. The display information for each pair of pixels then comprises two bits of data. A 1K×8 background RAM 302 may be used to store a set of data bytes which serve as pointers to the 32×30 array.

Each eight-bit byte of data in the RAM 302 points to an initial address in the 4K×8 background ROM 304. The particular background ROM then contains 256 different pictures which may be selected for display in each block of the array.

The background RAM 302 is addressed by a 2-to-1 background multiplexer 306. The background multiplexer, under control of the microprocessor, selects either the microprocessor address bus 308 or a ten-bit timing bus 210 from the timing selection. The most significant bits on the timing bus are the fourth through seventh most significant bits of the vertical count, V3–V7; the remaining bits are the five most significant horizontal count bits, H4–H8, as shown in FIG. 13. The lower order horizontal and vertical counter bits are not used for addressing the background RAM thereby insuring that the address lines to the RAM change only 32 times during a horizontal line and 32 times for a vertical scan. That is, the address lines change only on every 17th horizontal count and every 9th vertical count. Thus, whenever the horizontal and vertical counts lie within the boundaries of a block, the same eight bits of data appear at the output of the background RAM 302.

The background RAM 302 output is latched into a background latch 312. The latched data becomes the upper address lines to the background ROM 304. Latching is clocked by NAND gate 313 on the third horizontal count after the RAM address changes in order to accommodate the access time of the RAM.

The three least significant vertical count bits and the fourth least significant horizontal count bit, in decreasing order, make up the low order address lines to the background ROM 304, also as shown in FIG. 14. The upper address lines thereby remain fixed while the low order lines count out bytes in the background ROM on every ninth horizontal count during the scan of a single line. The eight bits of data comprising one byte from the background ROM are then latched into a background out latch 314. The eight bits comprise data representing four pars of pixels.

A 4-to-1 multiplexer 316 converts the eight bits into a two bit wide stream 318. The multiplexing is controlled by the second and third least significant horizontal counter bits, thereby providing a background resolution one-half that of the foreground.

The 2-bit wide stream 318 from the 4-to-1 multiplexer inputs to the alternate least significant input bits of the 2-to-1 B-multiplexer 202, as indicated in FIGS. 11 and 12. The output of the B-multiplexer addresses the color RAM through the 2-to-1 C-multiplexer 206, as already described. An alternative construction of the embodiment may use separate color RAM's for foreground and background. The second set of inputs of the C-multiplexer may be connected to the microprocessor, thereby providing a capability of direct microprocessor control of the color output from time to time.

The background RAM is partially updated from time to time during vertical blanking. Update is dictated by the play of the game. In normal play, only a very few background blocks will need to be altered and even a very slow microprocessor will have time to make the alterations during vertical blanking.

Data for the background RAM is taken off the microprocessor data bus by a bi-directional buffer 220 as described earlier with reference to the foreground data.

Figure 15:
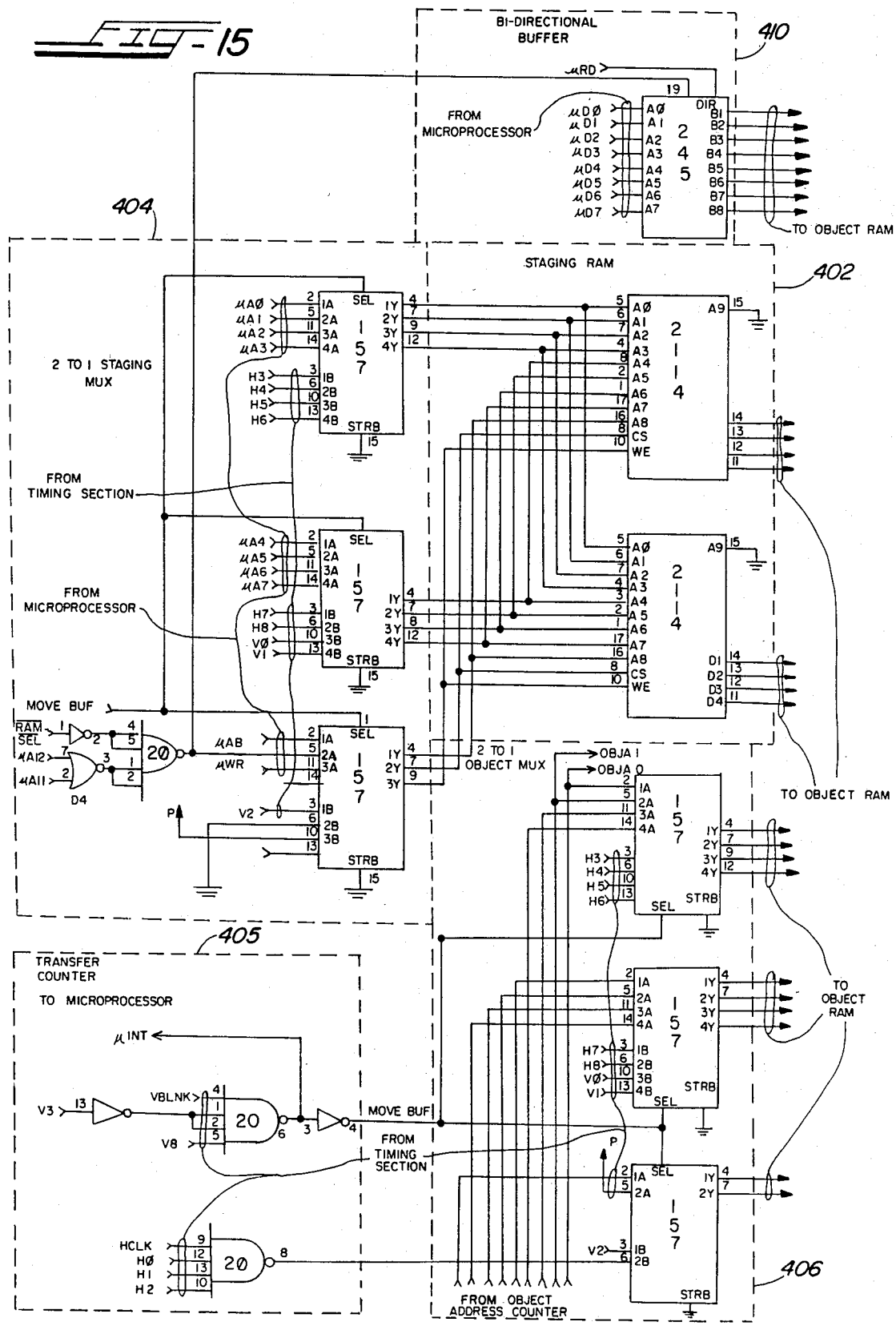
FIG. 15 is a circuit diagram of a specific construction of the communication section shown as a logical subsection in FIG. 3.

A staging RAM 402 in a communications section 26 may be utilized for communication with the controlling CPU (which may be microprocessor based) as shown in FIG. 3. FIG. 15 is a circuit diagram of a specific construction of the communication section. Data is moved from the staging RAM to the object RAM 50 during every second vertical blanking time at intervals of approximately 1/30 sec. The total move takes eight horizontal line times—approximately 508 microseconds in the specific construction described herein. During the move time a staging multiplexer 404 addressing the staging RAM selects a transfer counter 405 as input. An object multiplexer 406 addressing the object RAM simultaneously selects the transfer counter as input. Selection occurs at the beginning of the final eight vertical counts of the second vertical blank period. In the specific construction shown in FIG. 11 there is provision for the microprocessor to prevent the selection from occurring.

The transfer counter 405 steps through successive locations in the staging RAM 402; the data from the staging RAM is presented as input to the object RAM 50. A write enable signal is also generated by the transfer counter from the clock 30 and horizontal counter 32 and sent to the object RAM for each address. Because the address lines to each of the RAM's are identical, data is therefore transferred from the staging RAM 402 to the object RAM 50.

An interrupt signal sent to the microprocessor by the transfer counter 405 at the beginning of the transfer is used to inhibit the microprocessor from transferring data during the next 508 microseconds, during the time the staging RAM 402 is transferring its data.

The data transfer occurs between vertical counts 496 and 503. On vertical count 504 the staging multiplexer 404 switches and allows the microprocessor address bus to address the staging RAM. The object multiplexer 406, at the same time, allows the object address counter 52 to address the object RAM for readout purposes. The staging RAM is thereby available to be refreshed by the microprocessor except during vertical counts 496 to 503. Microprocessor data is input into the staging RAM through a bi-directional buffer 410 which may communicate with a microprocessor data bus 412.

The transfer counter 405 operates upon combinations of outputs from the horizontal and vertical counters. In the specific construction it is a nine bit counter. The five least significant bits are the five most significant horizontal count bits, as shown in FIG. 15. The three most significant bits are the three least significant vertical count bits. The counter thereby counts from zero to 1023 during the time required to draw four horizontal lines. Thus, in the specific construction, only one-half the available time is used for data transfer.

The staging RAM in FIG. 15 is constructed utilizing a pair of commercially available Intersil IM2114 RAM's with 1024×4-bit memories.

The flip feature is associated with the timing and foreground sections and controlled, in the specific construction, by the microprocessor. The underlying principle of the flip feature involves complementary, or backward, counting as a method for inverting and/or obtaining right-to-left reversal of the images presented on the screen. The embodiment described herein readily lends itself to complementary counting which, properly applied, merely reverses the horizontal and/or vertical scanning directions of the raster scan.

A FLIP command from the microprocessor inverts the entire picture, interchanging right-left and up-down, as required for a cocktail table game where two players are sitting opposite each other. The FLIP command affects the output of the timing section.

FIG. 16 is a more detailed schematic of the timing section than the simplified schematic in FIG. 2. The horizontal counter 32 of FIG. 2 is seen to comprise a horizontal first counter 500 and a FLIP horizontal logic circuit 502. The horizontal first counter 500 comprises a plurality of horizontal synchronous counters 510 feeding a horizontal logic circuit 512 as may be seen in the circuit diagram, FIG. 17. The horizontal counters are clocked by the leading edges of the positive 100 microsec. HCLK pulses from the system clock 30. The horizontal logic circuit emits a low on the 317* line on the 317th count, and a low on a 634* line on the 634th count. The 634* low is fed back to, and resets the horizontal synchronous counters 510, causing it to output lows on each of ten output lines, SH0 to SH9. The horizontal synchronous counters are thereby reset on every 635th count.

The horizontal synchronous counters 510 are clocked by the 100 ns. HCLK pulses generated by the system clock 30 and the D-type flip-flop 514. The HCLK pulses cause the counters to count on the output lines SH0–SH9 which are numbered in increasing order of significance.

The vertical counter 34 of FIG. 2 is seen to comprise a vertical first counter 520 and flip vertical logic 522, as shown in FIG. 17. The vertical first counter comprises a plurality of vertical synchronous counters 530 and a vertical logic circuit 532. The vertical logic circuit 532 emits a high (low) on the VBLK (VBLK*) line between vertical counts 239.5 and 255.5 and between vertical counts 495 and 511, as previously described. The vertical logic circuit also emits a low on a 511* line on count 511.

The vertical synchronous counters 530 are clocked by the SH9 line from the horizontal synchronous counters 510. The SH9 line goes high, as described, on every 635th count. The SH9 line is also the HBLK line to the monitor. The vertical synchronous counters are consequently advanced at the beginning of each HBLK period.

The vertical synchronous counters 530 are reset every 512th count by a low on the 511* line. The 511* low is a short pulse because the counters are reset substantially as soon as the 511* line goes low.

Figure 17A:
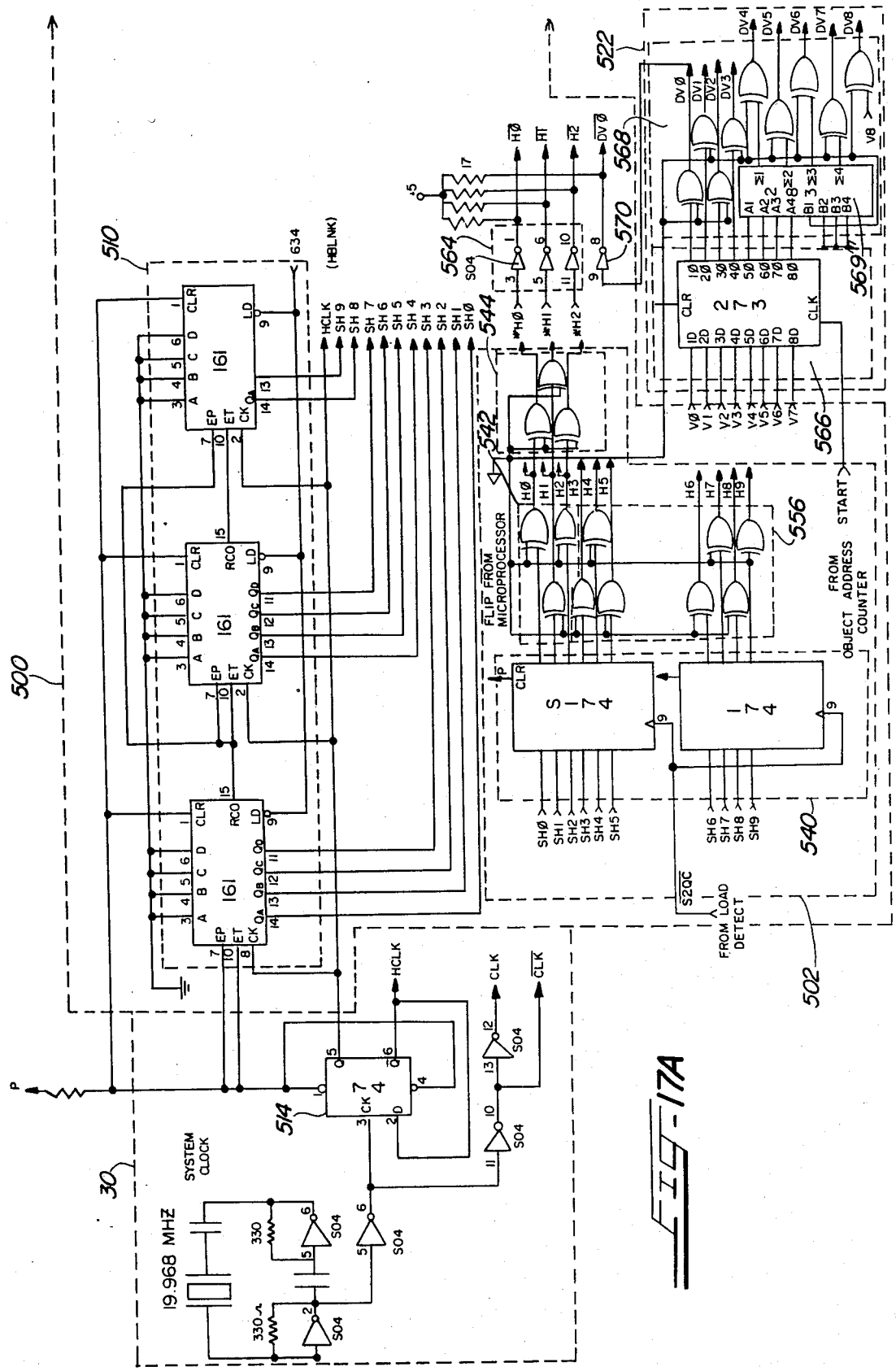

Circuit diagrams for the FLIP horizontal and vertical logic 502, 522 are also displayed in FIGS. 17A and 17B. The SH0 to SH5 outputs of the first horizontal counter 500 are fed to the input of a 74S174 D-type flip-flop 540 having a short set-up time approximately 5 ns. The outputs corresponding to inputs SH0 to SH2 are each fed to one of a first plurality of exclusive OR-gates 542. The second input to each of the exclusive OR-gates 542 is a FLIP line from the microprocessor.

The output of each of the exclusive OR-gates 542 is fed to a different one of a triad of exclusive OR-gates 544, each also having the FLIP line as input. The outputs of the OR-gates 544 corresponding, respectively, to the inputs SH0 to SH2 are labeled *H0 to *H2.

The flip-flop 540 is triggered by an SQ2C* signal from the load detect circuit which is shown in FIG. 4. The SQ2C* signal, because of delays in a pair of inverters 546, 548 OR-gates 550, 552, and flip-flop 554, all shown in FIG. 6, resembles an HCLK signal delayed by about 15 ns. The *H0–*H2 signals in consequence, taking into account delays in the exclusive OR-gates 542, 544 are delayed about 50 ns. with respect to the SH0–SH2 signals. The *H0–*H2 signals are substantially unaffected by the state of the FLIP line. If FLIP is low, each exclusive OR-gate transmits the signals from SH0–SH2 unaffected. If FLIP is high then each exclusive OR-gate complements the signals and the resulting double complement leaves the signal unaffected.

Signals SH3–SH9 are clocked through the flip-flop 540 and then each is fed to a different exclusive OR-gate of the triad 556. The exclusive OR-gates output signals, respectively, H3–H9 which are delayed by about 25 ns. with respect to SH3–SH9. The FLIP line is a second input to each of the plurality of gates 556.

It should be evident from the preceding discussion that when FLIP is high the signals H3–H9 will be the complements of SH3–SH9. The time delays on each of the signals *H0–*H2 and H3–H9 will be comparable.

The signals *H0–*H2 are fed to a triad of inverters 564 to generate the complementary signals H0*–H2*.

The flip vertical logic 522 comprises an octal D-type flip-flop 566 and a set of nine exclusive OR-gates 568. The FLIP line is an input to each exclusive OR-gate. The vertical first counter 520 output V0–V7 is input to the flip-flop 566. The eight output lines from flip-flop 566 are each fed to a different one of the exclusive OR-gates 568, V4–V7 also feeding through adder 569. The V8 output from counter 520 is fed directly to the remaining one of the exclusive OR-gates 568. A set of output signals DV0–DV8 are thereby respectively generated through the flip-flop 566 and exclusive OR-gates 568 as shown explicitly in FIG. 17.

A flip-flop 566 is clocked by the START line from the object address counter 52. The START line, it will be recalled, goes low just before the start of each horizontal line. It goes high on the first count from the counter control circuit which will be at the count of either the first or fourth horizontal pixel, depending upon whether an object is to be loaded. When START goes high the current vertical count V0–V7, is clocked into flip-flop 566 and through eight of the exclusive OR-gates 568, to generate the output signals DV0–DV7. The even or odd frame count bit, V8, is fed directly to the ninth of the exclusive OR-gates 568.

The DV0 output also inputs to an inverter 570 to generate a complementary output DV0*.

It should again be evident that when flip is high the signals DV0–DV8 and DV0* will be complemented. The adder 569 adds 16 to the complimented vertical count to compensate for the displacement introduced by VBLNK when counting backward from 511.

The logical description given so far of the operation of the embodiment did not depend in any manner upon the "direction" of counting of the horizontal and vertical counters 32, 34 except for the *H0–*H2 outputs of the horizontal counter which control timing logic. Conversely, since data is read out of the ROM's 68, 304 in 8-pixel groupings, the logic, other than control timing, is insensitive to the "direction" of counting of the *H0–*H2 horizontal counter outputs.

Thus, activation of FLIP by the microprocessor causes the significant horizontal and vertical counter bits to be complemented and will thereby cause the line buffer system to invert up-down and right-left in presenting its display An HFLP and a VFLP feature of the embodiment provide for inversion of a single object.

The VFLP and HFLP indicators are, respectively, the most significant bit and next most significant bit in the second byte of each object package. The HFLP and VFLP indicators are loaded into the picture latch 406 when an object is to be displayed. When either indicator is high the corresponding feature is enabled, as may be seen explicitly in FIG. 4.

The VFLP line provides one input to each of five exclusive OR-gates 574. The other input to each OR-gate is one of the lines carrying the four least significant bits from the vertical latch 58. The remaining one of the exclusive OR-gates 574 carries the even-odd frame count bit DV8. The outputs from the exclusive OR-gates 574 address terminals A2 to A6 of the foreground ROM as already described The foregoing description shows that activation of VFLP will present pictures from the foreground ROM 68 upside-down with respect to the normal presentation The HFLP line acts in an analogous fashion to the VFLP line. When the HFLP line is high it causes the pair of exclusive OR-gates 576 to complement the input to the two least significant address pins of foreground ROM 68. The four words comprising a line of a picture are thereby read out in backward order.

The HFLP high also selects the B-inputs from flip-muxes I and II, 82, 83 . . . . The B-inputs contain the output from shift registers 80 in inverted order from the A-outputs. As a result, the picture information will ultimately be read out backward, corresponding to right-left inversion, or reflection, of an individual picture.

Figure 18:
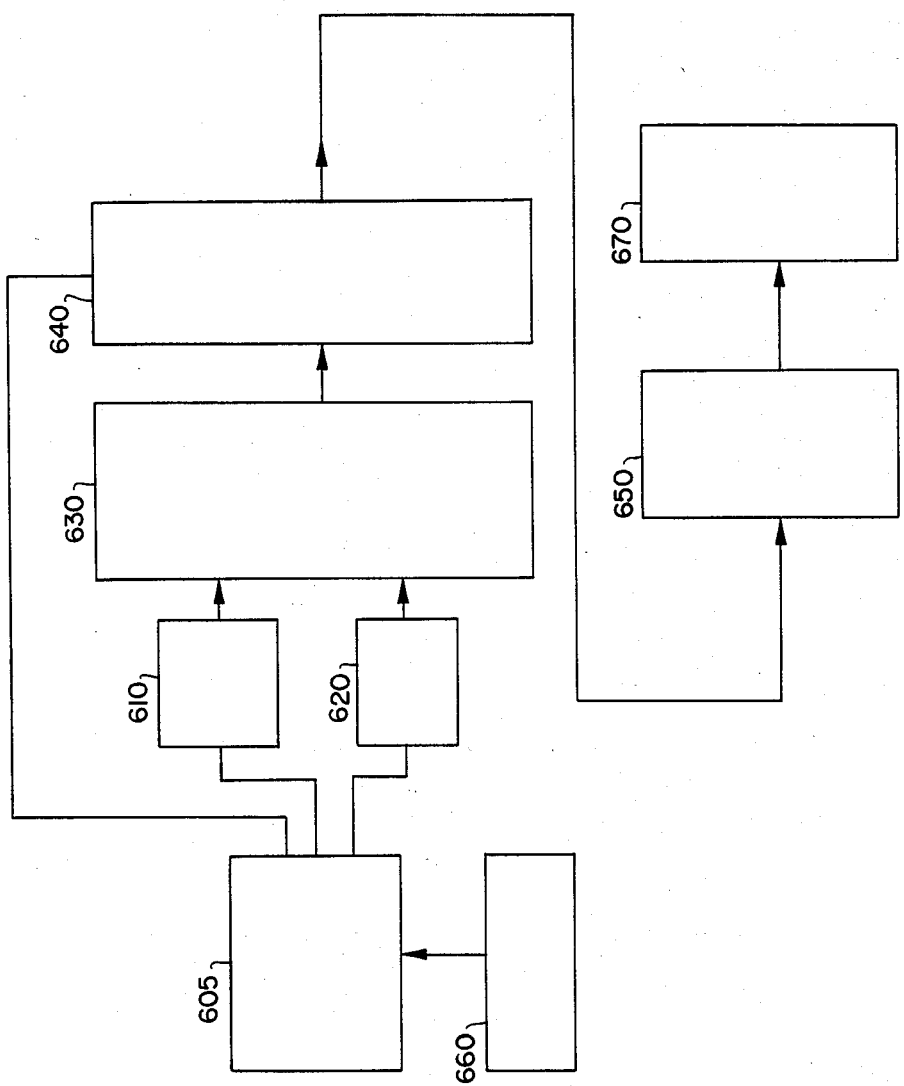
FIG. 18 is a functional block diagram of an overall system combining the elements of FIGS. 1-17.

FIG. 18 is a block diagram illustrating the functional blocks of a complete video display system as taught in FIGS. 1–17. A player stimulus signal is output from input means 660 responsive to player activation of a player control, such as joystick 695 or pushbutton 691–693 of FIG. 19. A control means 605 provides appropriate address, data and control signals to selectively store foreground and background object packet lists for storage in the foreground means 610 and background means 620, respectively. The foreground means 610 can be the system as illustrated in FIG. 3. The background means 620 can be the system as illustrated in FIG. 13. The video data corresponding to foreground and background object selection data are coupled from the foreground means 610 and background means 620 to the foreground/background selector means 630 which selectively provides output of either the foreground or background video data. In the illustrated embodiment, the selection of the foreground/background selector means 630 is determined responsive to the presence or absence of foreground video display data. If no video display data is present for a particular foreground location, then the selector means 630 selects the background object video display data for display. The output from the foreground/background selector means 630 is a video data signal which is coupled to the color memory 640 which selects one of a plurality of colors for association with a respective location on the display 670 corresponding to the video data from the selector means 630. The output from the color memory 640 is a multi-bit color value signal which is coupled to digital to analog converter 650 which converts the digital color value signals output from the color memory 640 to analog picture signals for driving the display 670. One embodiment of the foreground/background selector means 630, color RAM 640, digital analog conversion means 650, and associated display driver circuitry are illustrated in FIG. 10. In FIG. 10, the selector means 630 is represented by the blocks 25, 202, and 209. The color memory is represented at block 204. The digital to analog conversion circuitry is illustrated at block 206.

Figure 19:
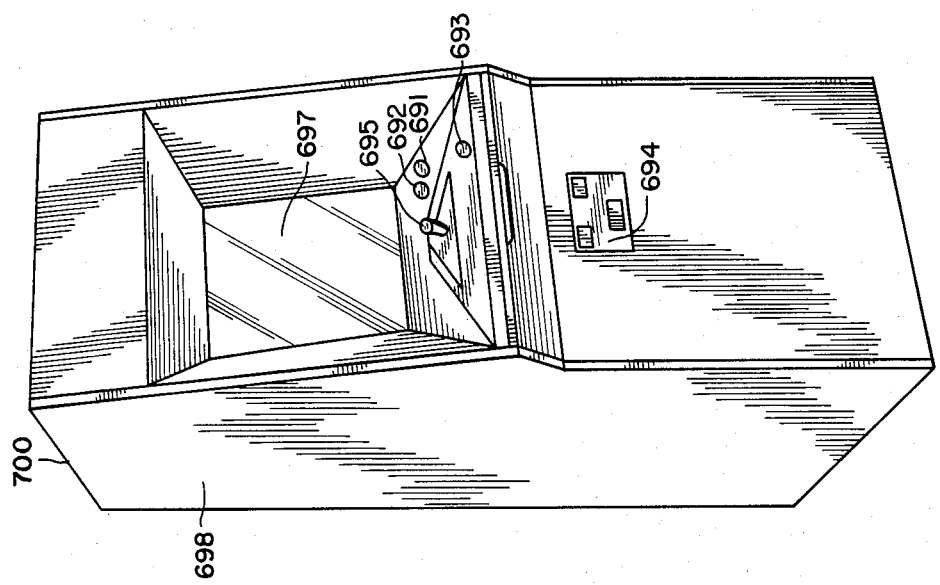
FIG. 19 is a perspective view of a video game system employing the present invention.

Referring now to FIG. 19, a perspective view of a video game system embodying various aspects of the present invention is shown. The video game system in block 700 is comprised of a cabinet housing 698 containing all necessary electronics therein. A display screen 697 is provided for player viewing. In the illustrated embodiment, the display 697 is provided on a slight vertical incline for viewing comfort by the player. In the illustrated embodiment, the display 697 is a raster scan display. The housing 698 also includes user input means for providing a source of player-provided stimuli for transfer to the system electronics. The player input control means include a joystick 695, and pushbuttons 691, 692 and 693. In the illustrated embodiment, the joystick 695 provides signals responsive to user movement of the joystick in a 360° radius about the center pivot point of the joystick to control interraction of the player with the game play and logic. In the illustrated embodiment, the pushbuttons 691 and 692 provide for 1 and 2 player selection of the game. The pushbutton 693 can be used to start the game, or may alternatively be utilized during the play of the game for various purposes. A coin slot mechanism 694 is provided on the front of the cabinet 698 to accept user coins or tokens to activate credits for game plays. Each game play can comprise multiple turns per single player, or can comprise alternating multiple turns for multiple players. Additionally, fewer or lesser numbers of joysticks and pushbuttons can be provided according to the requirements of the video game desired.

Figure 20:
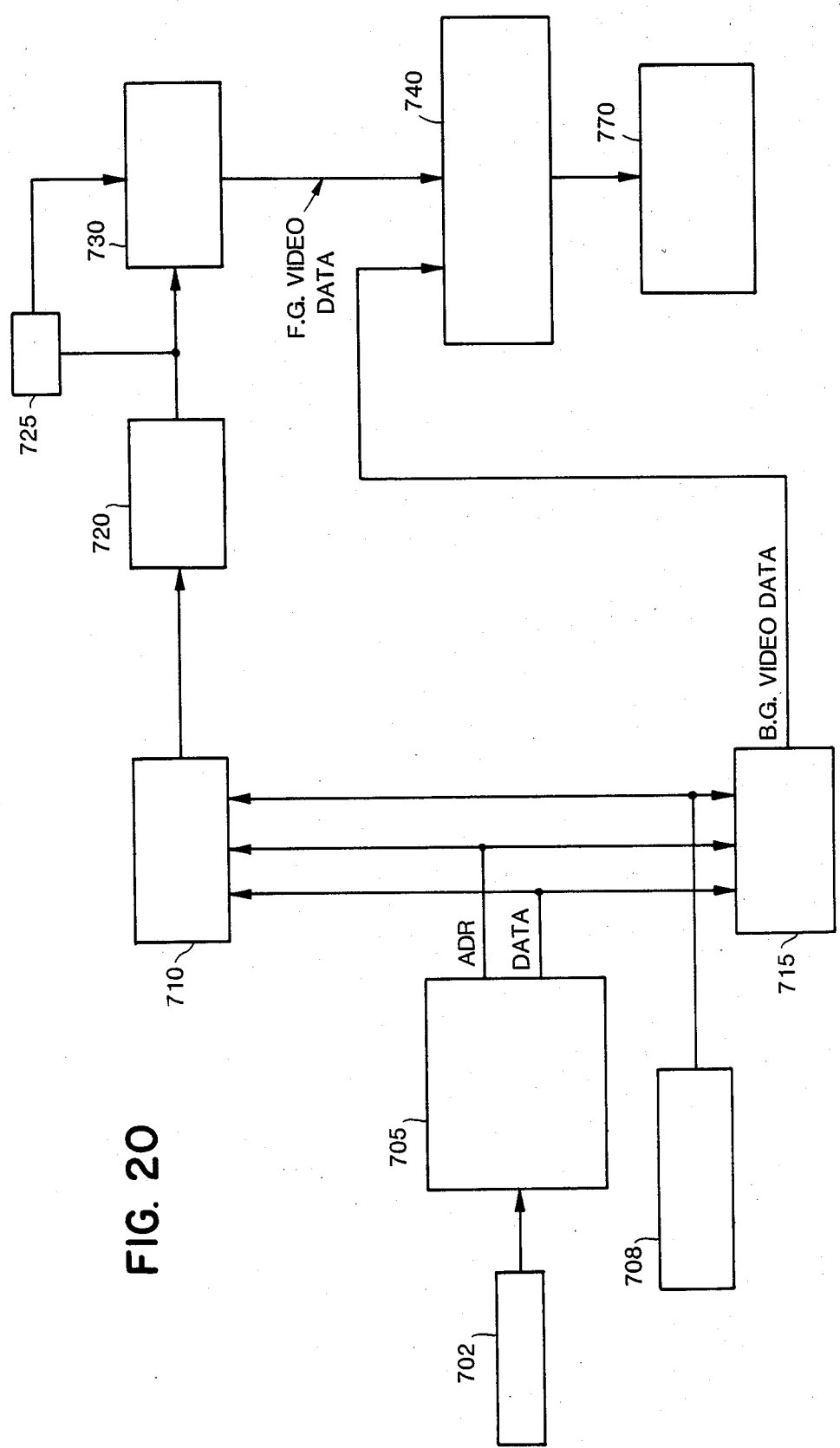
FIG. 20 is functional block diagram of systems of FIGS. 1 and 18 combined with priority overlay of video foreground objects.

Referring to FIG. 20, a functional block diagram is provided illustrating a system utilizing the novel concepts as taught in FIGS. 1–18, with the enhancement of providing prioritized overlay of video foreground objects. In the illustrated system embodiment, an input means 702 provides an output signal responsive to an external player-provided stimulus, such as a signal output responsive to player movement of the joystick 695 or one of pushbuttons 691–693 of FIG. 19. A control processor system 705 provides control of display presentation to be made upon the display 770 responsive to stored and predefined game logic and the output signal from the input means. The display means 770 provides a raster scan video display comprising a plurality of display lines. Each display line is further comprised of a plurality of display segments. The video display is provided responsive to picture signals as output from the display source selector 740, as discussed further hereinafter. The processor 705 causes object information to be selectively output from foreground object storage means 720 from predefined locations therein, in the form of blocks of foreground data, each such block corresponding to a display segment of the video display. The processor 705 also controls the selective outputting of background information from the background memory 715 in the form of blocks of background data, each such block corresponding to a display segment of the video display.

Figure 21A:
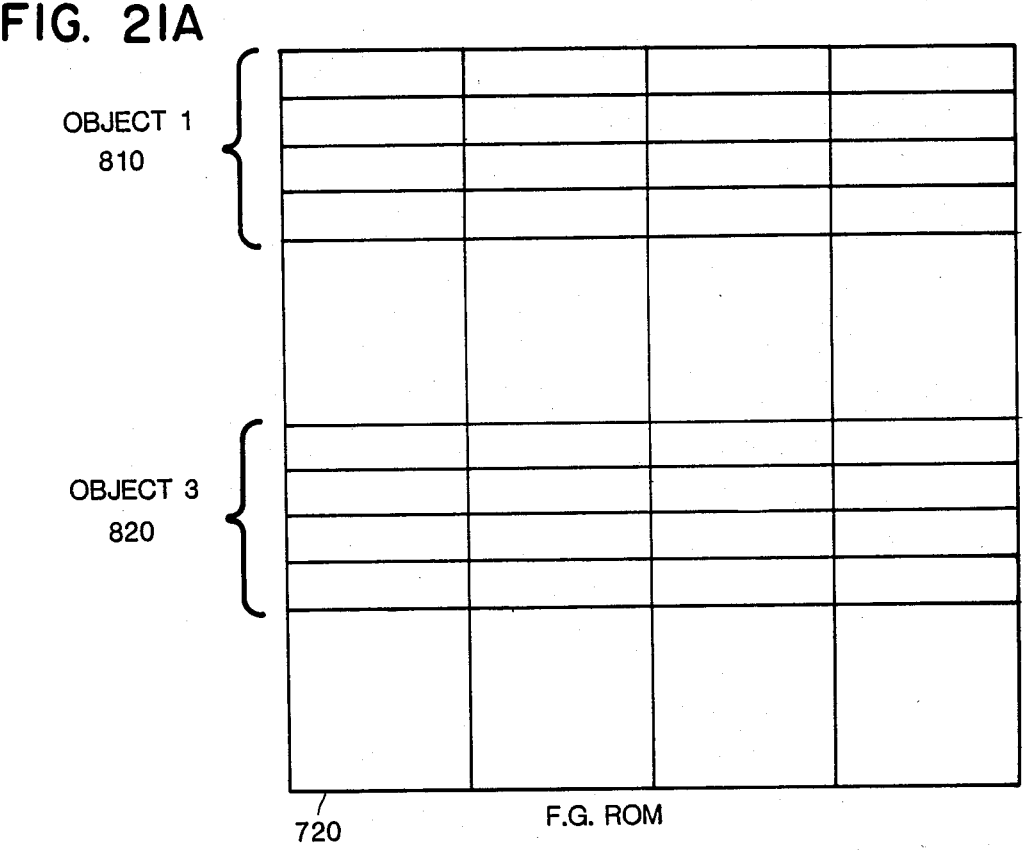
FIGS. 21 A-B illustrates the spatial correlation of the contents of two object packets in the foreground memory to the respective displayed picture blocks on the display screen.
Figure 21B:
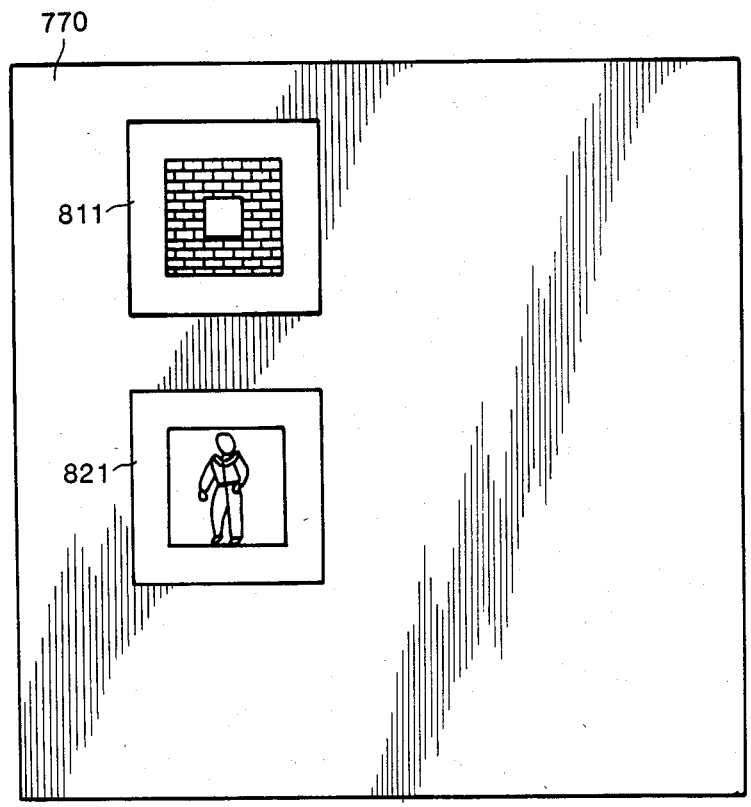
Figure 22B:
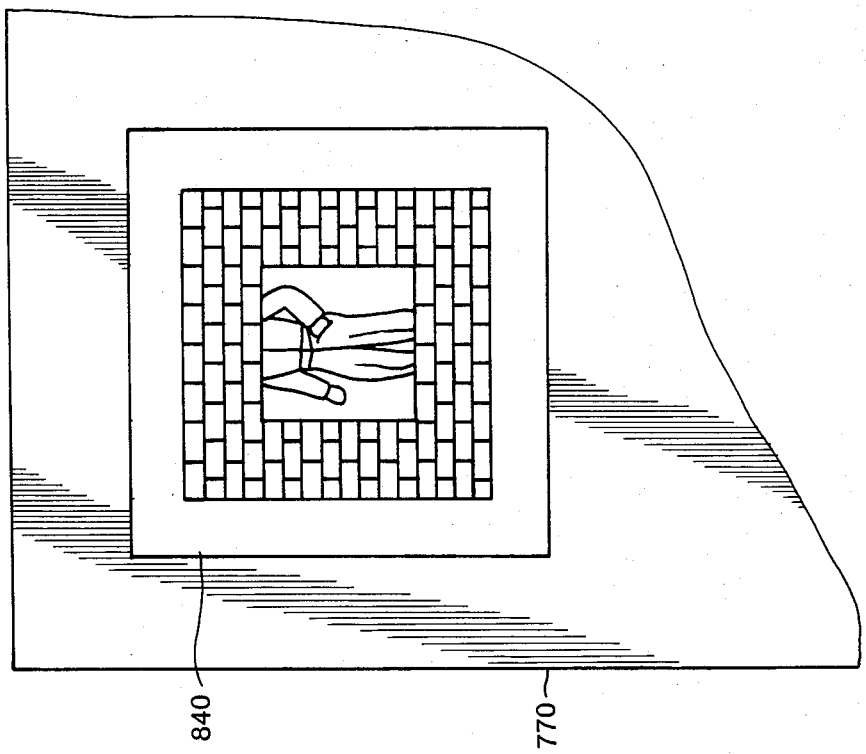
FIGS. 22 A-B illustrate the different displays resulting from swapping the priority of the object packets in the buffer memory.
Figure 22A:
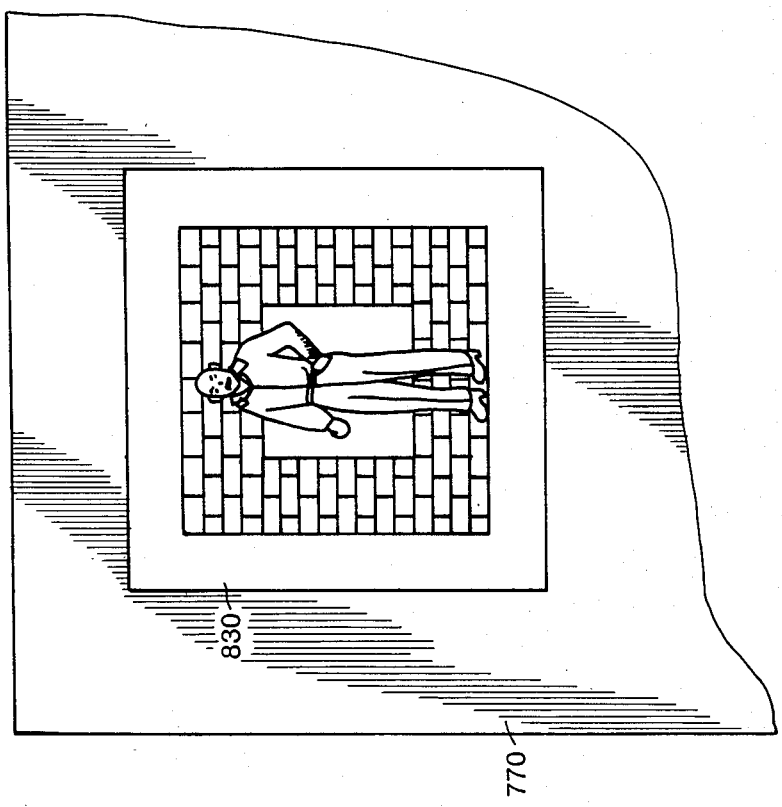
Figure 23A:
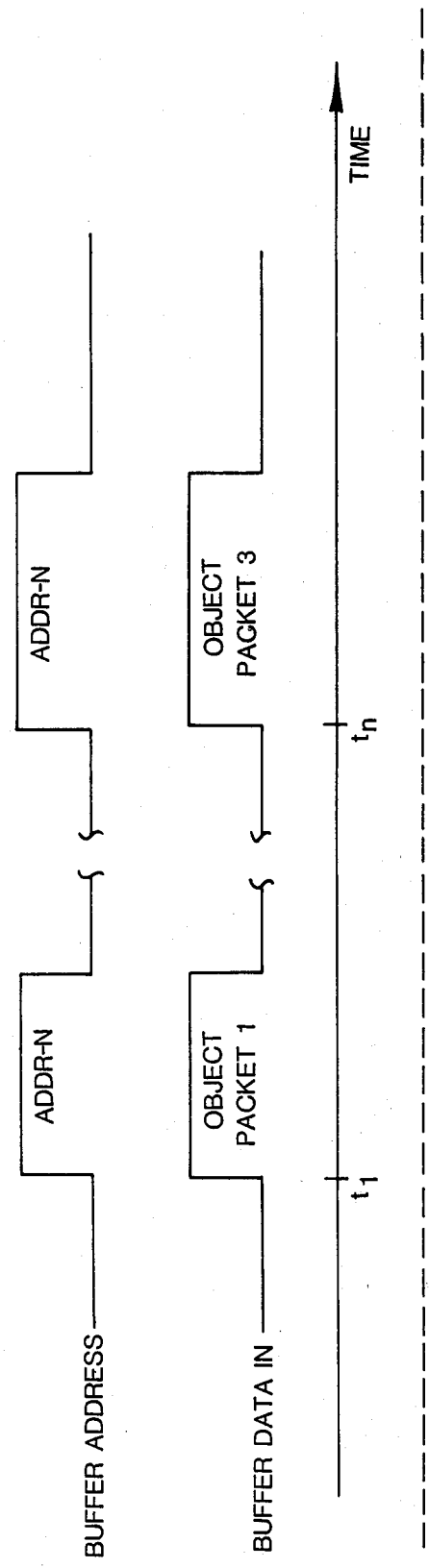
FIGS. 23 A-B illustrates the temporal relationship of writing into the buffers in the illustrated embodiments of FIGS. 22 A-B.
Figure 23B:
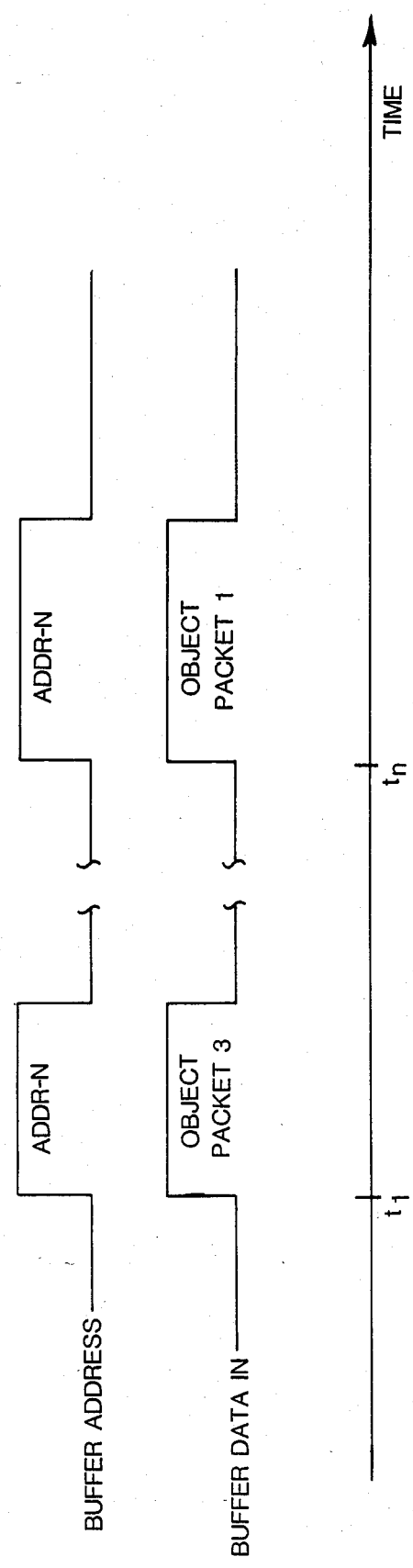

A buffer 730 provides means for selectively storing foreground data corresponding to a plurality of adjacent display lines on the monitor screen during active video display of a picture containing one of the adjacent display lines. Selection means, comprising the processor system 705 and overlay control circuitry 725, control the priority of display of overlaid objects for each single location on the display. In other words, the selection means controls the selective overwriting of object information representing multiple object data packets representing multiple pictures to single buffer locations, selectively overlaying only display video data, with the result as shown in FIGS. 21-23. The selection means selectively stores object information representing at least two different objects at the same location in the buffer, overwriting the object information first stored at the location in the buffer with a display part of the object information stored second in the location in the buffer. The display part of the object information refers to display data. Any default signal pattern indicating non-display data can be detected and utilized to inhibit overwriting of data to corresponding locations, such as zero detection. The controller 740 selectively provides picture signals to the display 770 for providing a picture display thereupon responsive to the foreground and the background video data as output from the buffer 730 and background memory 715, respectively. In the illustrated embodiment, the lack of displayable foreground video data enables the selection and display of the corresponding background video data for the respective display location.

As discussed above, the selection means provides for selective overwriting of object information representing multiple object data packets. The order in which the object data is written into the buffer is determinative of the overlay pattern which will result on the video display 770. In one embodiment, the processor 705 provides means for writing a list of object information in a selectable order into a foreground read-write memory 710. The order of prioritization of said object information can be determined by the order in which the object information is located within the foreground memory 710. If the foreground memory 710 is then scanned in a sequential ascending order, the higher addresses will then represent higher priority objects to be overlaid onto lower priority objects corresponding to the same buffer and display locations. The output from the foreground memory 710 is coupled to and drives the foreground object memory 720 for providing blocks of corresponding foreground data for coupling to the buffer 730 and overlay control circuit 725 to provide for writing to locations in the buffer 730 responsive to the blocks of foreground data as stored in the foreground memory 710. The priority of overlay of object information can thus be determined responsive to the order in which the object information is output from the foreground memory list means 710. Various prioritization schemes can thus be easily implemented. The overlay control circuit 725 is coupled to the output from the foreground object memory 720 and provides an output to the buffer 730. The overlay control circuit 725 inhibits writing of object information to locations containing display data when the object information to be overwritten consists of non-display data. This is illustrated in greater detail in FIGS. 25 and 26.

Figure 25:
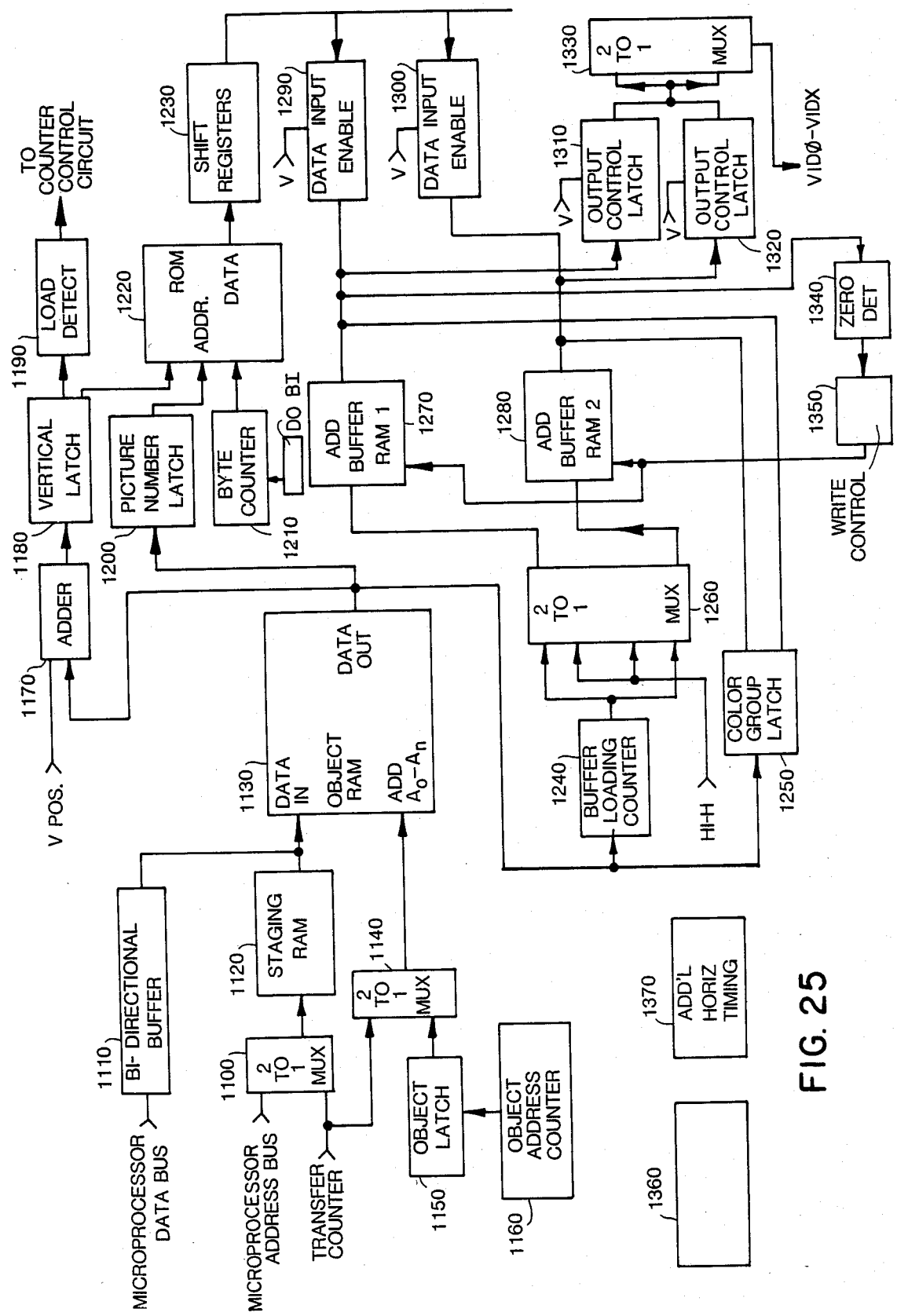
FIG. 25 is an electronic block diagram illustrating the detailed embodiment as illustrated in FIGS. 26 A-G.
Figure 26A:
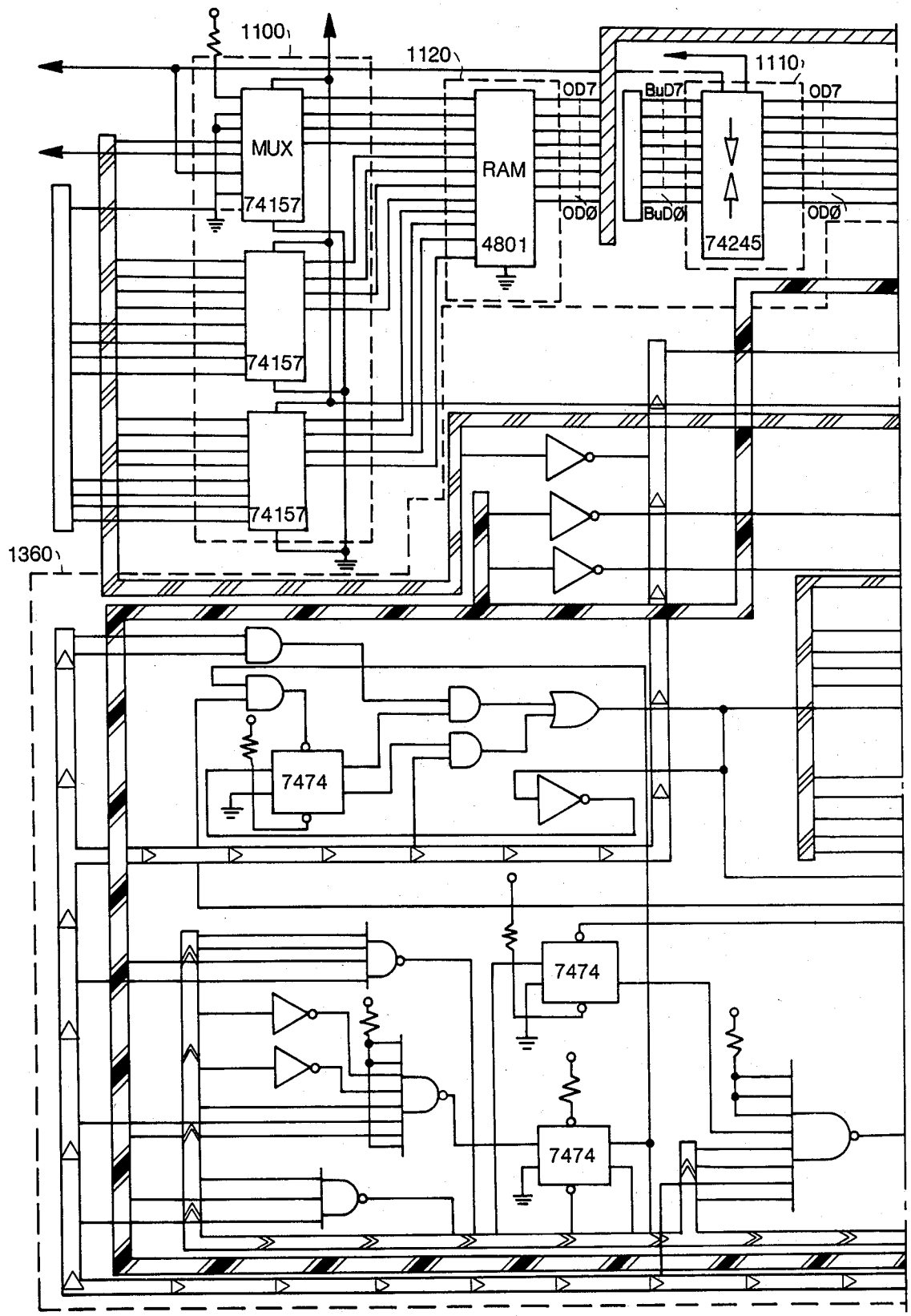
FIGS. 26 A–G are a specific detailed electronic schematic of the foreground video generator of FIGS. 18–25.
Figure 26B:
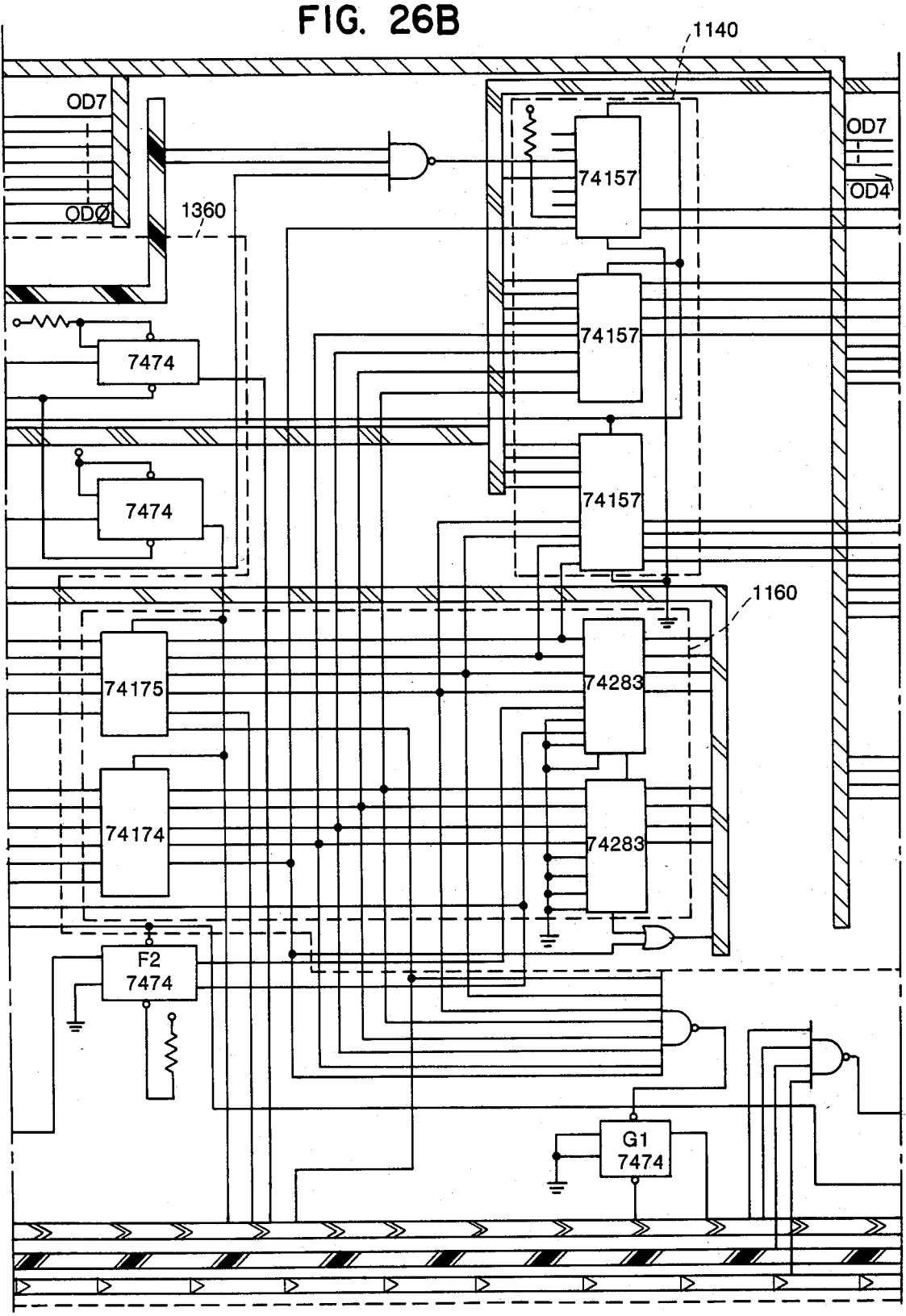
Figure 26C:
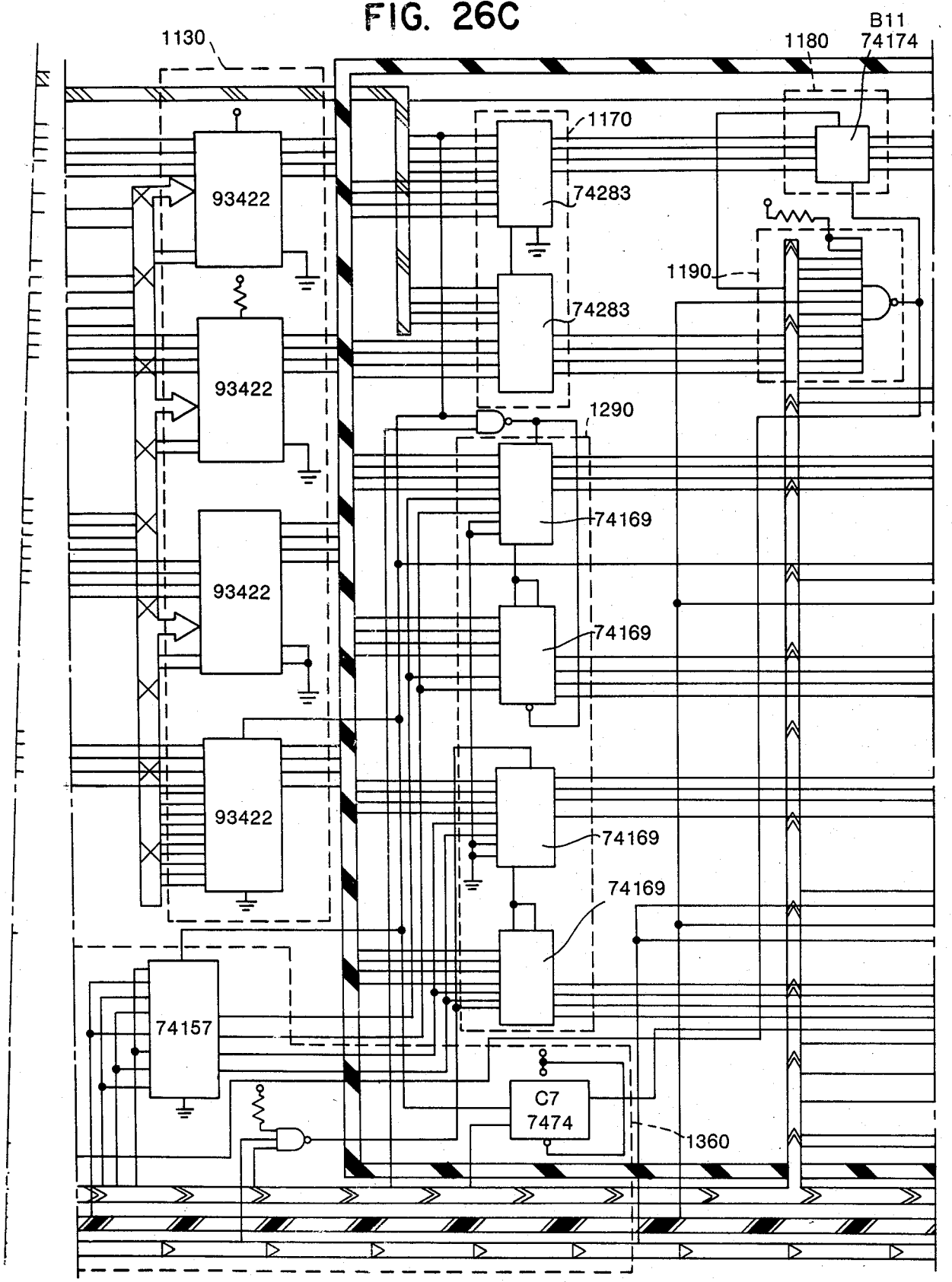
Figure 26D:
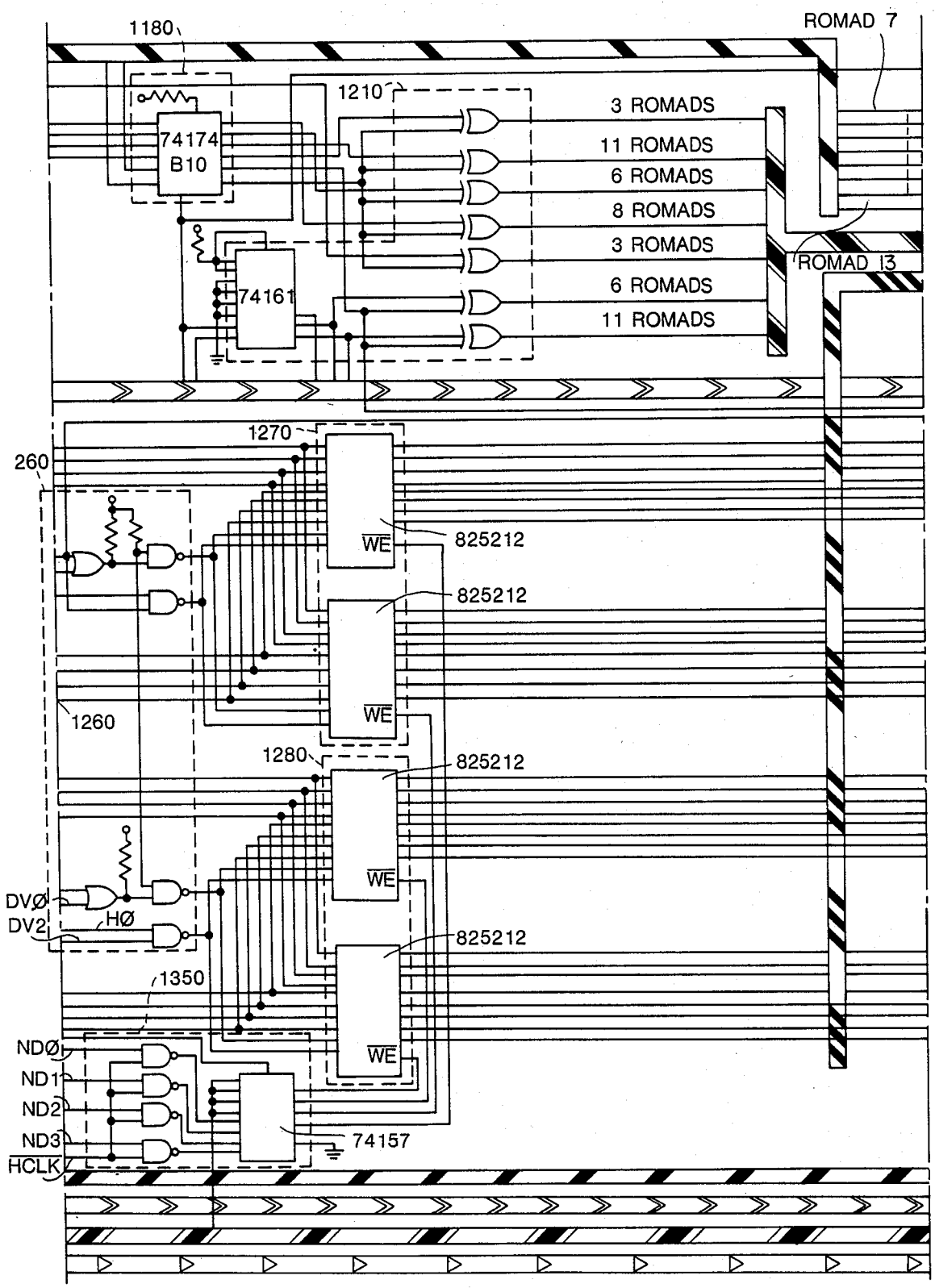
Figure 26E:
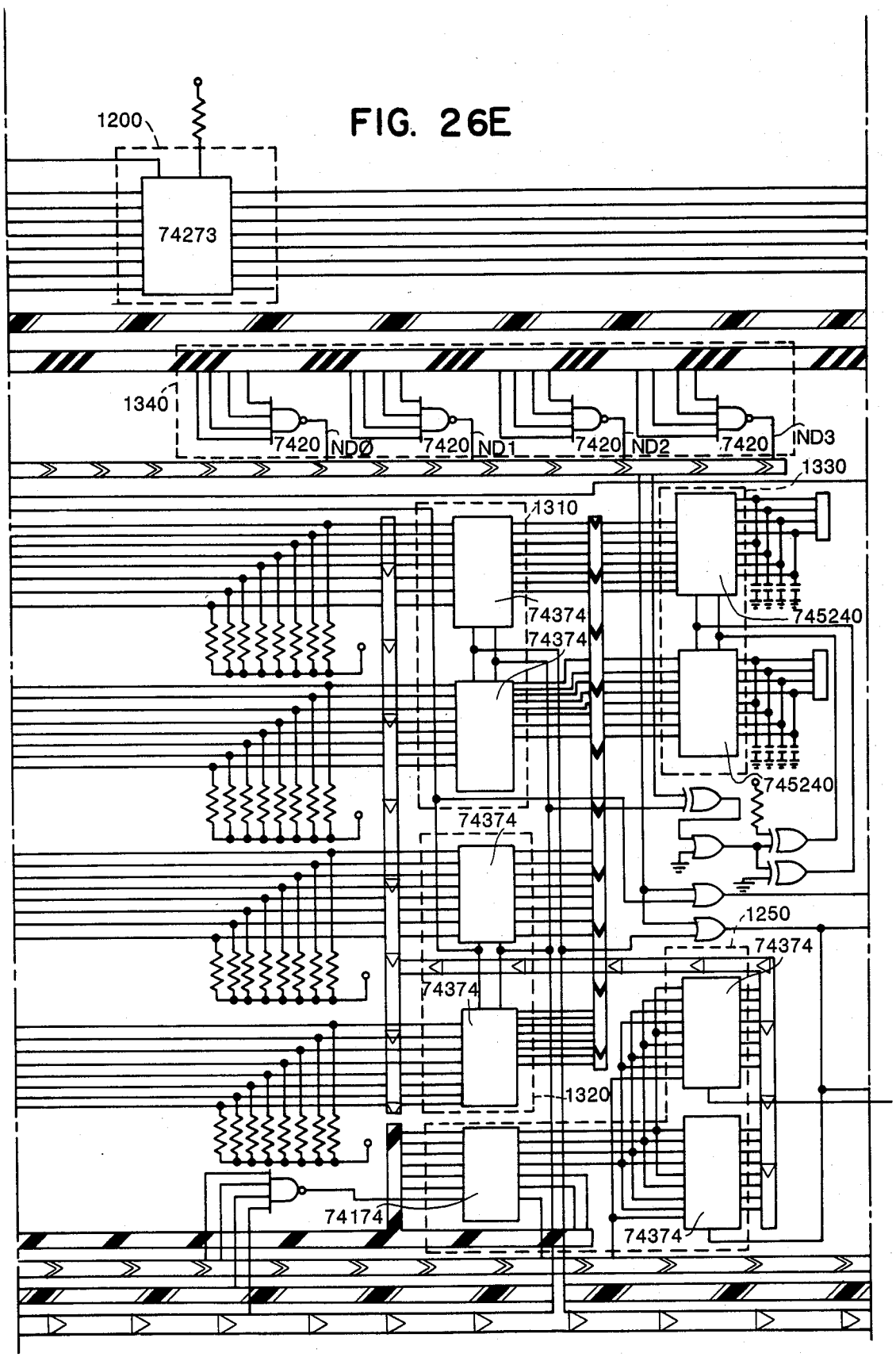
Figure 26F:
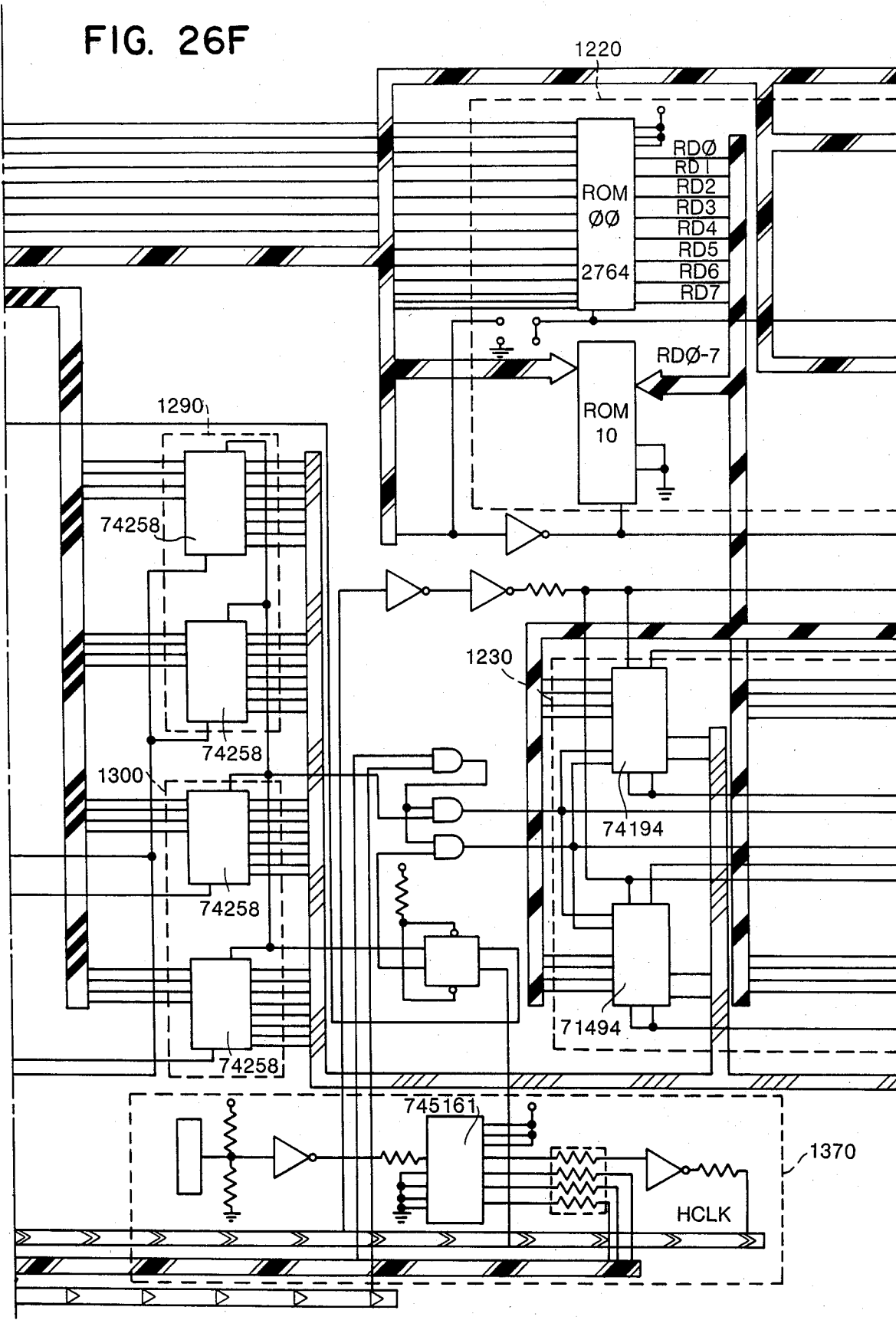
Figure 26G:
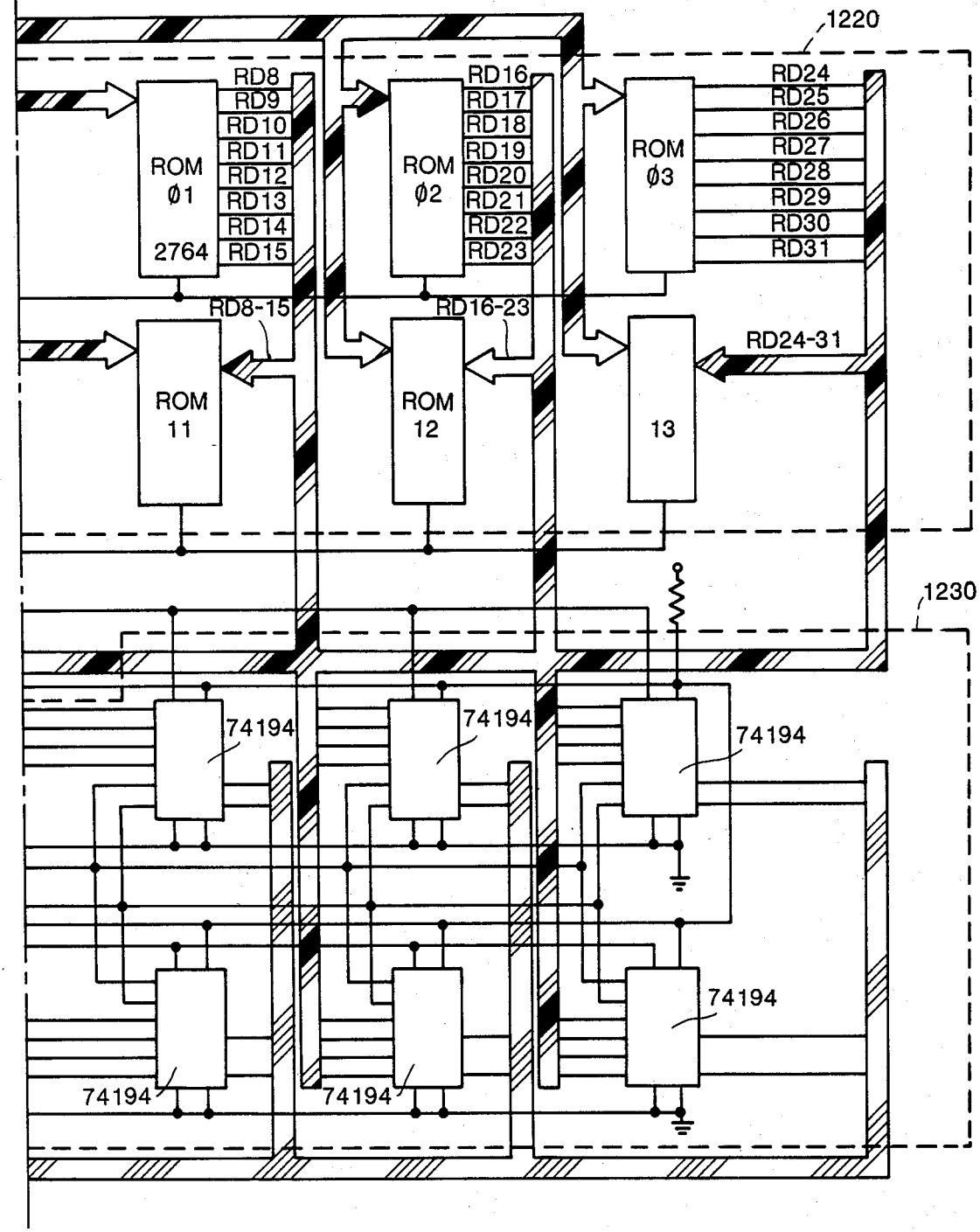

As seen in the illustrated embodiment of FIG. 25, the buffer 730 of FIG. 20 is comprised of a pair of random access memories 1270 and 1280 which are alternately refreshed and displayed. During active video display of a display line corresponding to the output of the contents of one of the pair of random access memories the other of the pair being refreshed (i.e. loaded). A shift register 1230 couples object packet information from the foreground object storage memory 1220 (e.g. 720 in FIG. 20), to the buffer memories 1270 and 1280 (730 of FIG. 20).

Referring now to FIGS. 21 A-B, the spatial correlation of the contents of two object packets in the foreground memory 720 to the respective corresponding displayed picture blocks on the display 770 are illustrated. The two object data packets, object 1 data packet 810, and object 3 data packet 820, of Fig. 21 A correspond to the two display picture blocks 811 and 821 of FIG. 21 B, respectively. As shown in FIG. 21 B, the picture block for object packet 1 comprises a brick wall having an opening in the center thereof corresponding to non-display data. The picture block 821, corresponding to object packet 3, illustrates a man standing up, with a background of non-display data.

Referring to FIGS. 22 A-B, one of the benefits achieved utilizing the present invention is illustrated by swapping the order of writing of the object packet 1 and 3 into the buffer memory. The order of writing of the object packets to the buffer memory determines the priority of overlay in the illustrated embodiment. This can be more clearly seen by referring to FIGS. 22 A-B and 23 A-B together. FIGS. 23 A-B illustrate the temporal relationship of writing into a single location in the buffers, relative to the priority ordering relationship of the overlaid display respectively illustrated in FIGS. 22 A-B.

Referring to FIG. 22 A and 23 A, the object packet 1 is first written to the buffer memory, followed by the writing of object packet 3 at some later time, as shown in FIG. 23 A. The resultant display picture block is illustrated in FIG. 22 A, showing the man with the brick wall having an opening therein positioned behind him. Thus, picture block 811 has been selectively and partially overlaid with picture block 821 only insofar as the picture block 821 contains displayable video data. By reversing the priority of writing, the opposite effect is achieved, as shown in FIGS. 22 B and 23 B. Thus, referring to FIG. 23 B, by first writing the object packet 3 data into the buffer at a selected address, and then, for the same display line, writing object packet 1 to the same location, at a later time, a reversed priority display is obtained as shown in FIG. 22 B. In FIG. 22 B, a portion of the man is seen through the opening in the wall. The picture block 821 is overlaid with the picture block 811, only as to displayable video data. Since the opening in the wall does not consist of displayable video data, the portion of the video data corresponding to object packet 3 representing the man is preserved in the display in the opening of the brick wall. Thus, the reversal and overlay priority between picture block 830 of FIG. 22 A and picture block 840 of FIG. 22 B is accomplished by simply reversing the order in which the object data packets are written to a single location in the buffer memory. This concept can be expanded to multiple selective overlays of a plurality of different object packets to a single location. Alternatively, the order of addressing the foreground memory 710 can be varied to vary the order of writing to the buffer 730. Other selectively variable priority ordering techniques can also be utilized.

Figure 24:
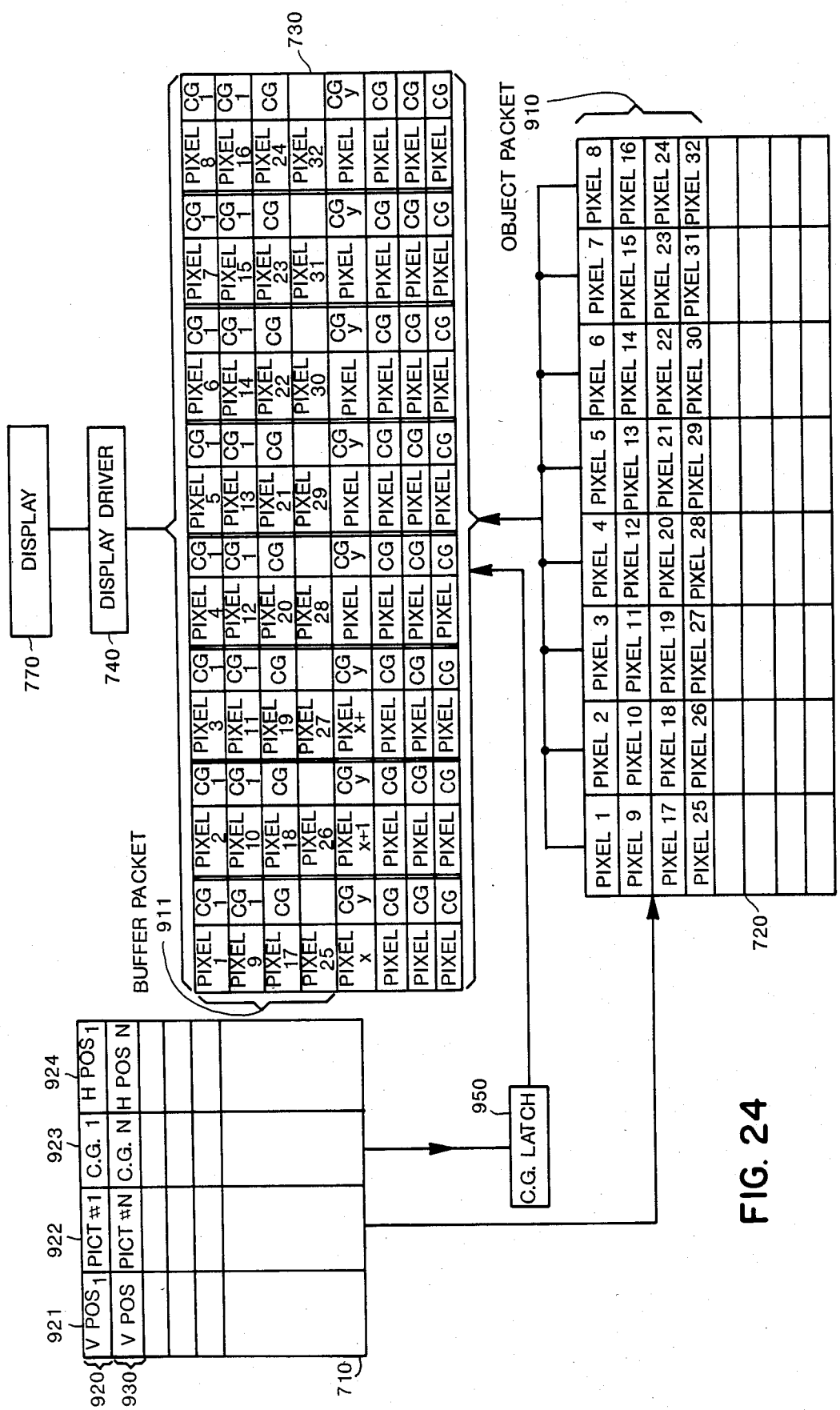
FIG. 24 illustrates the object packet contents as stored in the buffer memory, and illustrates the relationship and mappings of the contents of the buffer to the color ROM, color group latch, and display.

Referring now to FIG. 24, the relationship and mappings of the contents of the color memory 710, color object memory 720, color group latch 950, and buffer memory 730 is illustrated.

As discussed with reference to FIGS. 3 and 4, the object packet in the illustrated embodiment is comprised of four words of information. As illustrated in FIG. 24, foreground memory 710 contains four-word object packets, such as packets 920 and 930. As shown with reference to packet 920, each packet is comprised of four words comprising a starting vertical position word Vpos, 921, a picture number word, PICT, 922, a color group word, C.G., 923, and a horizontal position word, Hpos, 924. The foreground object memory 720 provides corresponding pixel object packets, such as object packet 910, responsive and corresponding to the picture number as output from the foreground memory 710. In the illustrated embodiment the pixel object packet 910 is comprised of 32 pixels corresponding to a foreground display pixel block. As illustrated, the foreground object memory 720 is also responsive to video timing signals for determining the proper pixels within the object packet 910 for output to the buffer 730. The color group information, e.g. 923, corresponding to the picture number, e.g. 922, as output to the foreground object memory 720, is stored in a color group latch 950. The color group word as stored in the latch 950 is output from the color latch 950 so as to be combined with the pixel data output from the foreground object memory 720 prior to storage in the buffer 730. The buffer 730 provides for combined storage of each pixel and the associated color group word in associated locations in the buffer 730, as shown in FIG. 24. Thus, object packet 910, in the illustrated embodiment, corresponds to the buffer packet 911 which combines the color group word as output from the color group latch 950 with the associated pixel data. The determination of when and where to place the combined pixel and color group data into the buffer is made responsive to the vertical position data Vpos from the foreground memory object respectively associated with the combined data being stored in the buffer. The video timing and horizontal position data Hpos from the respectively associated foreground memory object packet respectively in combination with the vertical position data Vpos are determinative of the selected locations within the buffer 730 where the combined data will be stored. The combined data is output, a pixel and color group word for each color value, to a display driver 740 which provides video picture signals to drive the display 770.

Referring to FIG. 25, a detailed electronic block diagram of a foreground generator system having priority overlay of foreground object packets is shown, corresponding to the detailed electrical schematic of FIGS. 26 A–G. The detailed electronic circuitry of FIGS. 26 A–G are blocked in functional subgroupings and numbered corresponding to the respectively numbered functional blocks of FIG. 25. The discussion hereafter relative to FIG. 25 applies to the FIGS. 26 A–G which corresponds to a detailed embodiment of the elements of FIG. 25. Thus, FIGS. 25 and 26 A–G correspond to an enhanced version of the systems as illustrated in FIGS. 3 and the detailed electrical drawings thereof (e.g. FIGS. 4–10, and 15). As described with reference to FIG. 3, and details therefore, the microprocessor such as the microprocessor system 705 of FIG. 20, provides data address and control signals to a bi-directional buffer 1110, a 2-1 mux 1100, and a 2-1 mux pair 1100 and 1140, respectively. An object address counter is initialized responsive to control signals, and passes an object address value to an object latch 1150 which provides an output to the other input of the 2-1 multiplexer 1140. A staging RAM 1120 selectively stores data from the microprocessor responsive to the 2-1 multiplexer 1100 and the bi-directional buffer 1110, so as to store the equivalent list of foreground object data in a manner so as not to interrupt the normal processing cycles of the system.

The output of the staging RAM is coupled to the data input of the foreground object memory 1130, which is also coupled to the output of the bi-directional buffer 1110. This allows either direct loading of data from the microprocessor, or passing of data from the staging RAM to the object RAM in a manner independent of and asynchronous to transfer of data from the microprocessor to the staging RAM. In this manner, the staging RAM acts to provide a buffer to isolate loading of object list data, and provide for minimal interruption in processing the power due to overhead in loading the foreground data list. Thus the operation of the foreground memory with the buffer memory, etc., is made essentially independent of the transfer of object list data from the processor to the staging RAM. The miscellaneous control circuitry 1360 provides for decode of video timing data and performs various other miscellaneous control functions. The circuitry of 1370 provides additional horizontal timing control signals.

The data from the staging RAM is transferred to the object RAM in a manner to avoid interference with operation of the processor system and the operation of the foreground system, as discussed with reference to FIGS. 3 et seq. in the operation of the staging system. The four words in the object packet within the foreground memory 1130 includes Vpos, picture number data, color group data, and Hpos data.

It will be illustrative to follow the flow of the words from a single object packet through the determination and loading of data to the buffer. Each of the four words is output and coupled to respective circuitry for performing the functions as described above herein with reference to FIG. 24. For example, the Vpos data is coupled to the input of adder 1170, to be processed along with an input from the raster scan video timing circuitry Vdpos. The output of the adder 1170 is coupled to the vertical latch 1180 which provides outputs to a load-detect circuit 1190 and to the foreground object memory 1220. The load-detect circuitry 1190 provides an output to the counter control circuitry. The picture number data output from the foreground memory 1130 is coupled to the picture number latch 1200 which provides an output to the foreground object memory 1220. Video timing circuitry provides a load object signal to clear a byte counter 1210 which is then clocked to provide an output coupled to the input of the foreground object memory 1220. The foreground object memory 1220 provides the object picture memory data packet output responsive to the output from the vertical latch 1180, the picture number latch 1200, and the byte counter 1210. In the illustrated embodiment, the foreground object memory provides four words of output in parallel, as illustrated in detail in FIGS. 26 F-G. The shift registers 1230 perform word-size conversion in conjunction with the buffer input multiplexers 1290 and 1300 for compatability with the word-size and timing of the buffers 1270 and 1280.

Referring again to the output of the object packet data from the foreground memory 1130, the Hpos data is coupled to the input of the buffer loading counter 1240 which provides outputs to multiplexer circuitry 1260. The multiplexer 1260 is responsive to the buffer loading counter 1240 and horizontal timing from the video timing circuitry to provide an output. The output from the multiplexer 1260 enables the addressing of locations in the buffer memories 1270 and 1280 having a spatial correlation to the respective object packets Hpos data.

Referring one last time to the output of the object packet from the foreground memory 1130, the color group word is coupled from the foreground memory 1130 to the input of the color group latch 1250. The output from the color group latch 1250 is coupled to the buffers 1270 and 1280, in a selective manner, so as to be stored and associated with respective pixel data values as output from the foreground object memory 1220 responsive to the picture number corresponding to the color group number for the object packet from the foreground memory 1130. The outputs from the line buffers 1270 and 1280 are coupled to output control latches 1310 and 1320, respectively, which in an alternating manner display the contents associated with one of the buffers 1270 and 1280 while the other of the buffers 1270 and 1280 is being loaded with display data for a subsequent display line. The output of the control latches 1310 and 1320 are coupled to a 2-1 multiplexer 1330 to provide word size conversion for providing an output of video data vid 0-vid X, including color group data and associated pixel data, for coupling to the foreground/background selector means, such as controller 740 of FIG. 20.

In the illustrated embodiment of FIGS. 26 A-G, the starting address is loaded into the counters 1240 at the same time that the color group word is loaded into the color group latch 1250. Thus, parallel output and synchronous utilization of object packet data words is achieved, providing for faster operation. The circuitry 1260 provides for selection of one of the buffers 1270 or 1280 responsive to timing and gating signals. The 2-1 address multiplexer 1100, foreground staging memory 1120, bi-directional buffer 1110, and miscellaneous control circuitry 1360 are shown in detail in FIG. 26 A. Additional details of the miscellaneous control circuitry 1360 are shown in FIG. 26 B, which also illustrates the details of the object address counter 1160. The foreground object memory 1130, portions of the miscellaneous control circuitry 1360, adder circuitry 1170, vertical latch circuitry 1180, load-detect circuitry 1190, and buffer loading counter 1240 are shown in detail in FIG. 26 C. A second part of the vertical latch 1180, the byte counter 1210, the 2-1 multiplexer circuitry 1260, write-control circuitry 1350 associated with the suppression of non-video data in conjunction with the zero detect circuitry (i.e. 1340 of FIG. 26 E), and the double-line buffer RAM 1270 and 1280 are shown in detail in FIG. 26 D. The picture number latch 1200, the zero detection circuitry 1340 (i.e. for detecting non-video data in the foreground object packet), multiplexer selector 1330 the output control latches 1310 and 1320, and the color group latch 1250 are shown in detail in FIG. 26 E. In FIG. 26 F, details are illustrated for the foreground object memory 1220 (e.g., illustrated as read-only memory circuits), buffer input multiplexers 1290 and 1300, object packet shift registers 1230, and additional horizontal timing circuitry 1370. The additional horizontal timing circuitry 1370 provides the horizontal clock bar HCLK signal output utilized in the write-control circuitry 1350 in conjunction with the zero detection outputs and the nd0 to nd3 outputs from zero detection circuitry 1340 to control the selective overwriting of display video data, inhibiting the overwriting of non-display video data. FIG. 26 G illustrates a detailed embodiment of the foreground object memory 1220 (e.g. illustrated as ROMs) and shift registers 1240.

It will, of course, be understood that modification of the present invention in its various aspects will be apparent to those skilled in the art, some being apparent only after study and others being a matter of routine design. As such the scope of the invention should not be limited by the particular illustrated embodiments and specific constructions herein described, but should be defined and limited only by the appended claims and equivalents thereof.

What is claimed is:

1. A video game system comprising:
    input means for providing an output signal responsive to an external player provided stimulus;
    display means for providing a raster scan video display, comprising a plurality of display lines each having a plurality of display segments, responsive to picture signals;
    foreground means for storing object information in a foreground memory in the form of blocks of foreground data, each such block corresponding to a display segment of the video display;
    background means for storing background information in background memory in the form of blocks of background data, each such block corresponding to a display segment of the video display;
    buffer means for selectively storing foreground data, corresponding to a plurality of adjacent display lines on the monitor screen during active video display of a picture containing one of said adjacent display lines;
    selection means for selectively storing object information representing at least two different objects at the same location in the buffer means, overwriting the object information first stored at said location in said buffer means with the non-zero part of the object information stored second in said location in said buffer means;
    control means for providing picture signals to the display means responsive to said buffer means and said input means.

2. The system as in claim 1, further comprising:
    list means for outputting a list of object information to be stored in said buffer means for display;
    order means for varying the order in which said object information is output from said list;

wherein said selection means prioritizes the order in which object information is written into the buffer means responsive to said order of output of said object information from said list means.

3. The system as in claim 1 wherein said buffer means comprises a pair of random access memories, said system further including transfer means for alternately refreshing said random access memories.

4. The system as in claim 1 further comprising:
foreground object storage means for selectively storing and outputting object package information;
a shift register for transferring object package information to said buffer means;
background object storage means for selectively storing and outputting background package information; and
background control means for transforming said background package information into a background data stream wherein each element of said background data stream comprises data for the control of a second group of adjacent pixels, wherein said second group at least partially includes said first group.

5. The system as in claim 1 further comprising:
means for reading and combining said data from said buffer means and said data from said background memory into a single data stream.

6. The system as in claim 1 wherein said control means is further comprised of conversion means for converting digital data to analog signals, including means for controlling the display of pixels in said video display.

7. The system as in claim 6 wherein said conversion means is further comprised of means for controlling the color of said pixels.

8. The system as in claim 1 further comprising picture flip means for inverting the entire picture with respect to one of a pair of axes parallel to and perpendicular to said display lines.

9. The system as in claim 1 further comprising object flip means for inverting an object representation with respect to an axis.

10. The system as in claim 3 wherein said transfer means is further comprised of:
processor means for generating said object package information;
bus means coupled to said processor means for carrying said object package information;
staging means, selectively connectable to said bus means responsive to said processor means during the display of a sequence of video pictures, for temporarily storing said object package information; and
moving means operably connected to said staging means and said object storage means for coupling said object package information from said staging means to said object storage means without interfering with said processor means generation of said object package information.

11. The system as in claim 10 wherein said moving means is further characterized as coupling said object package information at substantially regular intervals during display of the sequence of video pictures.

12. The system as in claim 11 further characterized in that said substantially regular intervals are spaced by approximately 1/30 of a second.

13. The system as in claim 11 wherein said moving means is further characterized as coupling said object package information from said staging means to said object storage means during a time interval of the order of 500 microseconds.

14. A priority ordered multiple video object display system for use with a raster scan display having a plurality of display locations on a plurality of display lines, said system comprising:
means for generating a list of ordered video object data packets;
buffer means for storing said list of ordered data packets at locations spatially associated with respective display locations;
means for varying the order in which said packets are written into said buffer means;
means for selectively suppressing zero overwrite for secondary writes to a single location in said buffer means during the construction of a common single display line stored within said buffer means.

15. The system as in claim 14 further characterized in that said buffer means is comprised of at least two independently operative buffers, each for alternatingly storing during construction and outputting during active video scan the video data necessary to result in video display of the respective video lines.

16. The system as in claim 14 further characterized in that each of said data packets is comprised of vertical position data, picture number data, color group data, and horizontal position data.

17. The system as in claim 16 wherein said picture number data includes vertical and horizontal display inversion data.

18. The system as in claim 17 further comprising:
foreground list memory for selectively storing and outputting said list of ordered data packets;
foreground object memory for outputting pixel data corresponding to a picture on the display, responsive to a respective picture number from said foreground memory;
a color group latch for storing and outputting the color group data associated with a respective object packets;
means for combining said color group data from said color group latch with the respective associated pixel data from said foreground object memory; and
means for storing said combined color group and pixel data in said buffer means.

19. The system as in claim 18 further comprising:
placement means for storing said combined color group and pixel data in said buffer means at selected locations therein responsive to said vertical position data from said foreground memory of the object packet respectively associated with the combined data being stored.

20. The system of claim 19 further characterized in that said placement means is responsive to the combination of the vertical and horizontal position data.

21. A method of presenting a video display on a raster scan display comprising the steps of:
providing a raster scan video display, comprising a plurality of display lines each having a plurality of display segments, responsive to picture signals;
storing object information in a foreground memory in the form of blocks of foreground data, each such block corresponding to a display segment of the video display;
storing background information in background memory in the form of blocks of background data, each such block corresponding to a display segment of the video display;

selectively storing in a buffer foreground data, corresponding to a plurality of adjacent display lines on the monitor screen during active video display of a picture containing one of said adjacent display lines;

selectively storing object information representing at least two different objects at the same location in the buffer;

overwriting the object information first stored at said location in said buffer only with the displayable part of the object information to be stored second in each location in said buffer;

providing picture signals responsive to said buffer and said background memory.

22. The method of claim 21 further comprising the steps of:

outputting a list of object information to be stored in said buffer for display;

varying the order in which said object information is output from said list;

prioritizing the order in which object information is written into the buffer responsive to said order of output of said object information from said list.

23. The method of claim 21 further characterized in that said buffer comprises a pair of random access memories, alternately refreshed by said transfer means.

24. The method of claim 21 further comprising the steps of:

reading and combining said data from said buffer and said data from said background memory into a single data stream.

25. The method of claim 21 further comprising the steps of:

converting digital data to analog signals and controlling the display pixels in said video display responsive to said analog signals.

26. The method of claim 21 further comprising the steps of:

inverting the entire picture with respect to one of a pair of axes parallel to and perpendicular to said display lines.

27. The method of claim 23 further comprising the steps of:

generating said object information stored in said foreground memory, temporarily storing said object package information in a staging memory during the display of a sequence of video pictures;

connecting said staging means and said object information;

coupling said object package information from said staging memory to said foreground memory without interfering with said generation of said object package information.

28. The method of claim 27 further comprising the steps of:

coupling said object package information at substantially regular intervals during display of the sequence of video pictures.

29. The method of claim 28 further characterized in that said substantially regular intervals are spaced by approximately 1/30 of a second.

30. A method of displaying a priority ordered multiple video object display for use with a raster scan display having a plurality of display locations on a plurality of display lines, comprising the steps of:

generating a list of ordered video object data packets;

storing said list of ordered data at locations spatially associated with respective display locations;

varying the order in which said packets are written into a buffer;

suppressing non-display data overwrite for secondary writes to a single location in said buffer during the construction of a common single display line stored within said buffer.

31. The method of claim 30 further characterized in that said buffer is comprised of at least two independently operative buffers, each for alternatingly storing during construction and outputting during active video scan the video data necessary to result in video display of respective alternating video lines.

32. A video game system comprising:

input means for providing an output signal responsive to an external player provided stimulus:

display means for providing a raster scan video display, comprising a plurality of display lines each having a plurality of display segments, responsive to picture signals;

foreground means for storing object information in foreground memory in the form of blocks of foreground data, each such block corresponding to a display segment of the video display;

background means for storing background information in background memory in the form of blocks of background data, each such block corresponding to a display segment of the video display;

buffer means for selectively storing foreground data, corresponding to a plurality of adjacent display lines on the monitor screen during active video display of a picture containing one of said adjacent display lines;

selection means for writing in a selectable order the object information representing at least two different objects to the same location in the buffer means, overwriting the object information first written to said location in said buffer means with the non-zero part of the object information stored second in said location in said buffer means; and control means for providing picture signals to the display means responsive to said buffer means and said input means.

33. The video game system as defined in claim 32 further characterized in that said selection means selectively swaps the order of writing said object information.

* * * * *